(12) United States Patent
Williams et al.

(10) Patent No.: US 6,792,935 B2
(45) Date of Patent: Sep. 21, 2004

(54) PORTABLE BARBECUE GRILL AND THERMAL CHEST

(75) Inventors: Ben Williams, Midland, GA (US); John Duncan McNair, Taipo (HK); Tomas Matusaitis, Chicago, IL (US); Jeff Condon, Chicago, IL (US); Bruce John Morgan, Sheung Shui (HK)

(73) Assignee: W. C. Bradley Company, Columbus, GA (US)

( * ) Notice: Subject to any disclaimer, the term of this patent is extended or adjusted under 35 U.S.C. 154(b) by 0 days.

(21) Appl. No.: 10/216,585

(22) Filed: Aug. 9, 2002

(65) Prior Publication Data

US 2003/0034025 A1 Feb. 20, 2003

Related U.S. Application Data

(60) Provisional application No. 60/311,652, filed on Aug. 10, 2001.

(51) Int. Cl.[7] .............................. F24C 3/08; F25D 23/12
(52) U.S. Cl. ..................... 126/41 R; 126/25 R; 126/40; 126/50; 62/331
(58) Field of Search ............................ 126/25 R, 37 R, 126/41 R, 9 R, 9 B, 40, 50, 276, 38; 312/236, 237; 62/331, 457.1; 99/357; 431/253

(56) References Cited

U.S. PATENT DOCUMENTS

| | | | |
|---|---|---|---|
| 1,524,961 A | 2/1925 | Asche | 126/38 |
| 3,866,994 A | 2/1975 | Bonin | 312/236 |
| 4,471,748 A | 9/1984 | Venable | 126/1 |
| 4,873,841 A | * 10/1989 | Bradshaw et al. | 62/239 |
| 5,048,505 A | 9/1991 | Hait | 126/9 |
| 5,070,857 A | 12/1991 | Sarten | 126/25 |
| 5,154,158 A | 10/1992 | Lindsey | 126/9 |
| 5,285,656 A | * 2/1994 | Peters | 62/457.1 |
| 5,363,977 A | 11/1994 | Hoff | 220/4.27 |
| 5,966,961 A | 10/1999 | Ziggiotto | 62/331 |
| 6,153,857 A | * 11/2000 | Gunnels | 126/9 R |
| 6,216,488 B1 | * 4/2001 | Rucker | 62/331 |

FOREIGN PATENT DOCUMENTS

JP 5-253028 10/1993

* cited by examiner

Primary Examiner—Josiah Cocks
(74) Attorney, Agent, or Firm—James W. Kayden; Thomas, Kayden, Horstemeyer & Risley, LLP

(57) ABSTRACT

Combination cooking grills and thermal chests are provided. One such combination includes a thermal chest that defines an interior and which includes an opening communicating with and providing access to the interior. The combination also includes a grill that defines a cooking interior and which incorporates a grilling surface mounted within the cooking interior. A repositioning assembly is mounted to the thermal chest. The grill is movable, via the repositioning assembly, between a lowered position in which the grill limits access to the interior of the thermal chest via the opening, and a raised position in which the grill is spaced from the thermal chest such that access to the interior of the thermal chest is provided via the opening.

18 Claims, 18 Drawing Sheets

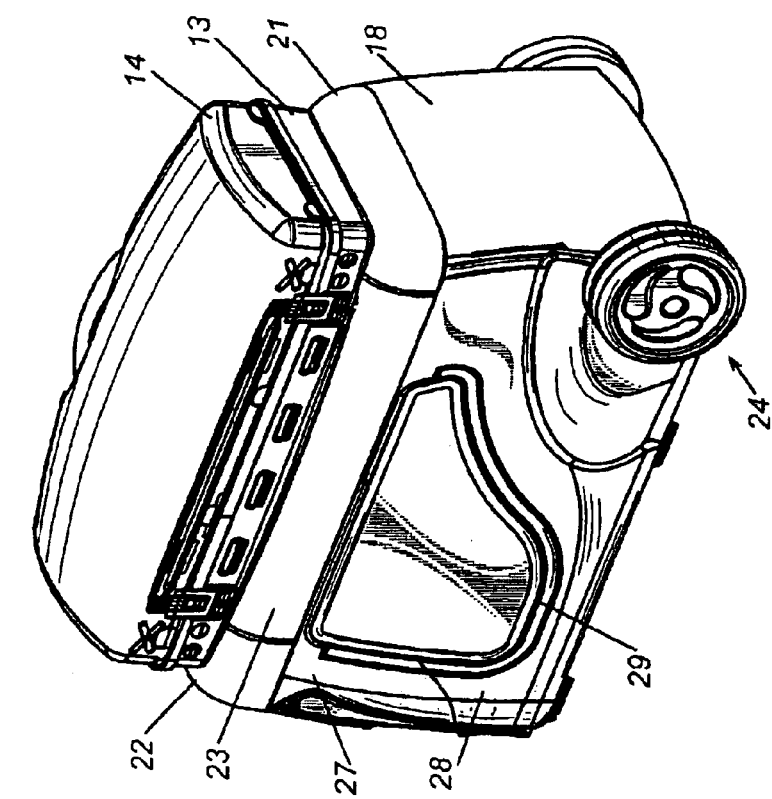
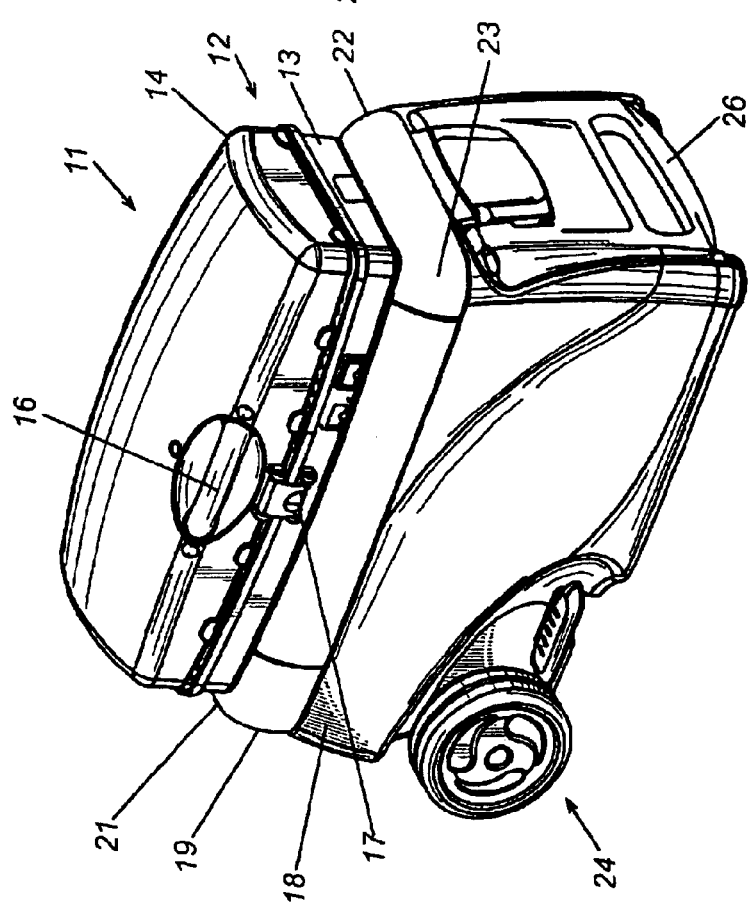

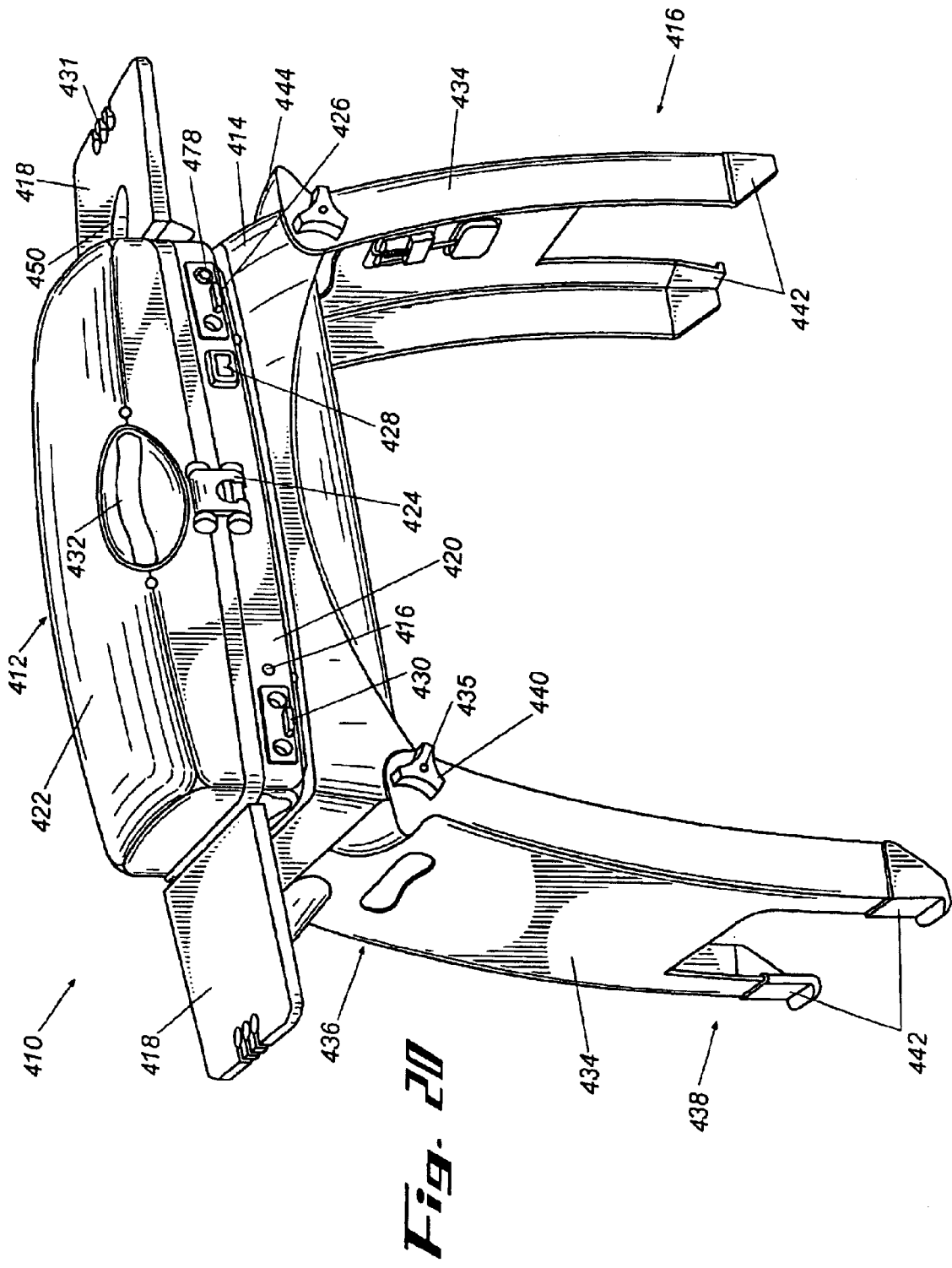

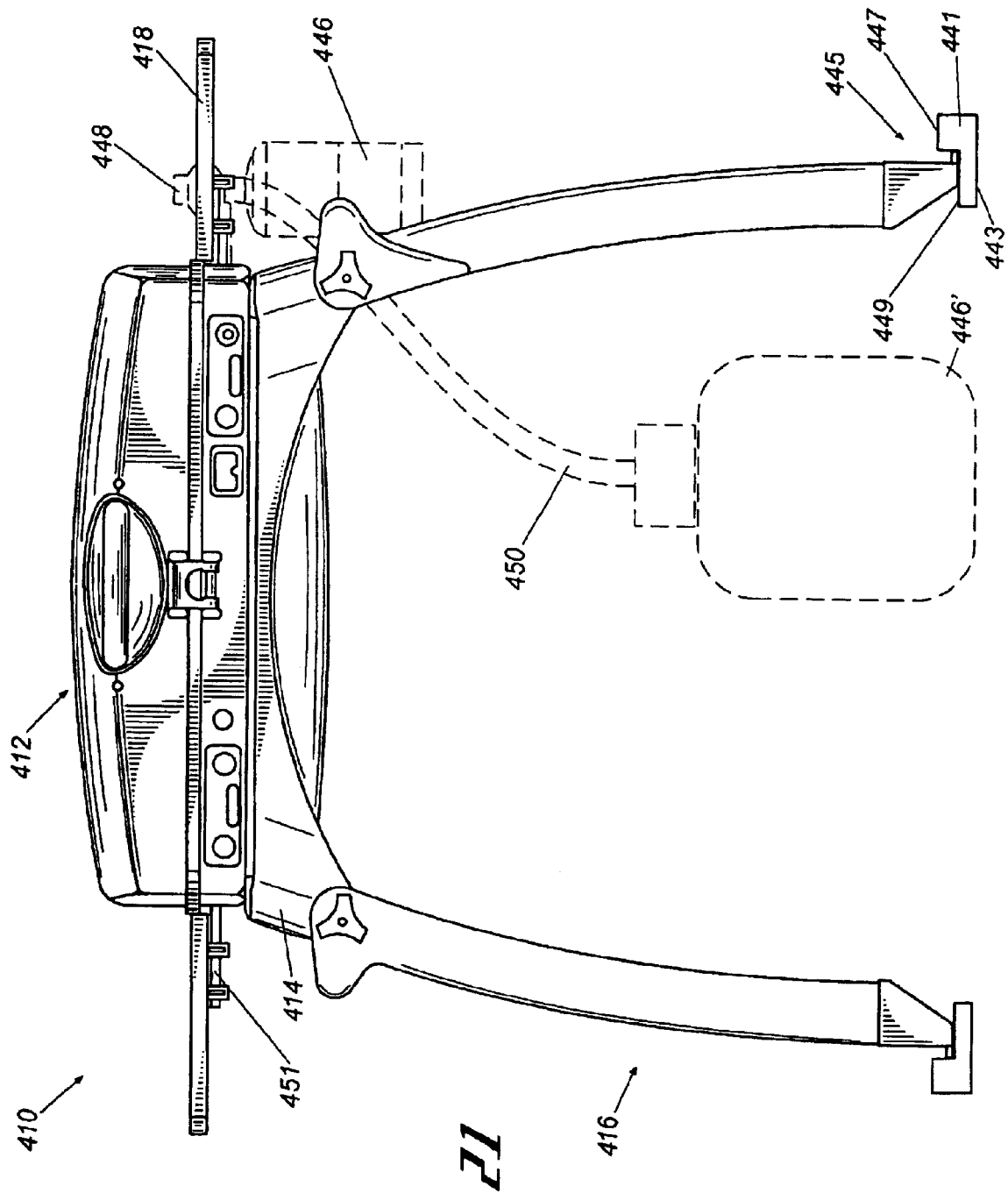

PORTABLE BARBECUE GRILL AND THERMAL CHEST

CROSS REFERENCE TO RELATED APPLICATION

This utility application claims the benefit of and priority to U.S. provisional application entitled, "Portable Barbecue Grill and Thermal Chest," having serial No. 60/311,652, filed Aug. 10, 2001, which is entirely incorporated herein by reference.

TECHNICAL FIELD

The present invention is generally related to cooking grills and, more particularly, is related to portable cooking grills, each of which includes a thermal chest for supporting the grill.

DESCRIPTION OF THE RELATED ART

Gas-fired barbecue grills continue to increase in popularity due to their convenience of operation, relatively instant availability for use in cooking, substantially even heat distribution and cooking of food, ease of clean-up and versatility to cook numerous varieties of foods. Gas grills typically include a metal grid as a cooking surface and oftentimes use porous lava rocks disposed beneath the cooking grid to radiate heat upward to the cooking surface. This configuration permits grease and juices released from the cooking food to drip through the cooking grid and onto the lava rocks, eventually resulting in grease accumulation and flame flare-ups, or uncontrollable flames. Metal bars or metal grates may also be placed beneath the cooking surface in an attempt to collect and vaporize grease and other drippings.

Although it is common for full size gas grills to be located on a movable cart with the grill body centrally located toward the top center of the cart at approximately waist height, the mobility of these gas grills is somewhat limited. This arrangement places the predominant weight of the grill on top of the cart, possibly resulting in a somewhat top-heavy and unstable configuration. Furthermore, the mobility of these grills is limited due to the weight and cumbersomeness of the cart assembly and the grill, commonly fixedly attached to each other.

While smaller, more readily portable grills are also popular, these grills are typically small in size and often heated by charcoal. Although these grills are small and intended to be portable, the charcoal burning grills require a user to transport charcoal, lighter fluid, and matches. Charcoal not only requires the transport of items additional to the grill; charcoal is slower than gas to heat up, is messy to clean up and requires substantial cooling-off time before packing up.

Seemingly, the portable grill is most convenient in its use in tailgating, camping, or at locations such as the beach. However, the food to be cooked and the necessary cooking tools generally must be separately conveyed to the site of use.

Based on the foregoing, it should be understood that there is a need to overcome these and/or other perceived shortcomings of the prior art.

SUMMARY OF THE INVENTION

The present invention involves combination cooking grills and thermal chests. In this regard, an embodiment of a combination cooking grill and thermal chest in accordance with the invention includes a thermal chest that defines an interior, with the interior being sized and shaped for receiving food items. The thermal chest also includes an opening that communicates with and provides access to the interior. The grill of the combination defines a cooking interior. The grill is movable between a lowered position in which the grill limits access to the interior of the thermal chest via the opening, and a raised position in which the grill is spaced from the thermal chest so that access to the interior of the thermal chest is provided via the opening.

Another embodiment of a combination cooking grill and thermal chest in accordance with the invention includes a thermal chest that defines an interior and which includes an opening communicating with and providing access to the interior. The combination also includes a grill that defines a cooking interior and which incorporates a grilling surface mounted within the cooking interior. A repositioning assembly is mounted to the thermal chest. The grill is movable, via the repositioning assembly, between a lowered position in which the grill limits access to the interior of the thermal chest via the opening, and a raised position in which the grill is spaced from the thermal chest such that access to the interior of the thermal chest is provided via the opening.

Other features and/or advantages in addition to, or in lieu of, those presented above will be or may become apparent to one with skill in the art upon examination of the following drawings and detailed description. It is intended that all such additional features and/or advantages be included herein within the scope of the present invention.

BRIEF DESCRIPTION OF THE DRAWINGS

The invention can be better understood with reference to the following drawings. The components of the drawings are not necessarily to scale, emphasis instead being placed upon clearly illustrating the principles of the present invention. Moreover, in the drawings, like reference numerals designate corresponding parts throughout the several views.

FIG. 1 is a front perspective view of an embodiment of a grill/chest combination in accordance with the present invention.

FIG. 2 is a rear perspective view of the grill/chest combination of FIG. 1.

FIG. 20 is a perspective view of an embodiment of a portable grill apparatus, including an optional leg assembly, in accordance with the present invention.

FIG. 27 is a perspective top view of an inner portion of the grill apparatus of FIG. 20.

DETAILED DESCRIPTION

Figure 3:
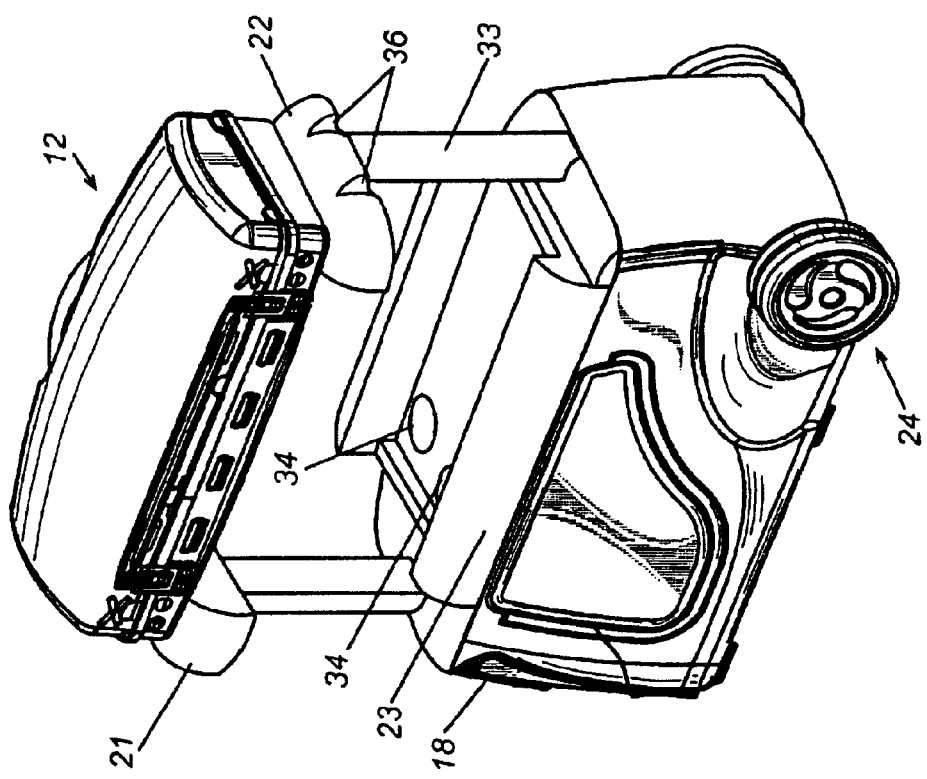
FIG. 3 is a front perspective view of the grill/chest combination of FIG. 1 as set up for cooking.

As will be described in detail here, the present invention involves the use of a cooking grill in combination with a thermal chest, the combination of which provides a portable cooking and storage system.

As shown in FIG. 1, an embodiment of a grill/chest combination 11 in accordance with the present invention comprises a grill 12 having a bottom casting 13 and a fitted top casting 14 preferably hinged thereto. Top casting 14 has a handle 16 for raising and lowering it relative to the bottom casting 13. A latch 17 is provided for latching the two castings together. Grill 12 may take any number of configurations and cooking arrangements, i.e., heating elements, cooking surfaces, etc. One preferred arrangement is shown in U.S. patent application Ser. No. 09/927,106, filed on Aug. 10, 2002, entitled "Portable Barbecue Grill," which claims priority to U.S. provisional application serial No. 60/224,821, filed on Aug. 11, 2000, entitled "Portable Barbecue Grill," both of which are assigned to the W. C. Bradley Company and both of which are incorporated herein by reference.

Grill 12 is carried by and supported by a thermal chest 18 having a frame 19 configured to hold bottom casting 13 and which forms the top of chest 18. Frame 19 comprises first and second end members 21 and 22 and a center member 23, which together conform to the shape of the bottom casting 13 for supporting it.

Chest 18 has, at one lower end thereof a wheel and axle arrangement 24 and at the other end a foldable handle 26 which, as will be apparent subsequently, enables the user to roll the grill/chest combination 11 to a desired location. In addition, as best seen in FIG. 2, chest 18 has, on the rear wall 27 thereof an indentation 28 that is partially covered by a net 29. This arrangement permits storing of at least some of the cooking paraphernalia common to grill cooking, with net 29 retaining it within indentation 28.

Figure 4:
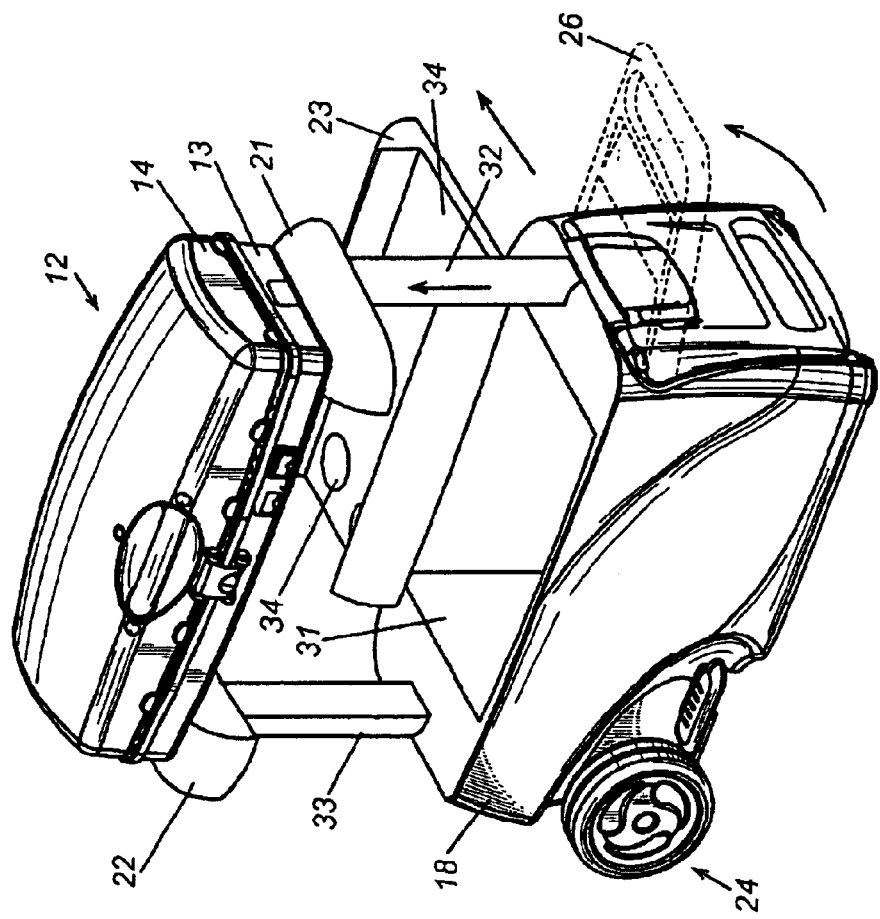
FIG. 4 is a rear perspective view of the grill/chest combination of FIG. 3 with the chest closed.

FIG. 3 depicts the apparatus 11 as setup for cooking on grill 12 and for access to the interior 31 of chest 18. Frame component 21 is mounted on a slidable post 32 and component 22 is mounted on a like post 33. Posts 32 and 33 are normally stored within bores in chest 18, as shown and can be supplied with suitable latches, not shown, for retaining them in their extended position, as shown in FIG. 3 and, if desired, in their retracted position, as shown in FIGS. 1 and 2. With posts 32 and 33 fully extended and latched in place, grill 12 is elevated well above the top of chest 18. Access to the interior 31 of chest 18 may then be realized by sliding the center component 23 of the frame 19 to the rear, as shown. The track for sliding member 23 may be a flange and groove arrangement, as shown, as any of a number of possible arrangements. The top surface of member 23 may also function as a tray. See the recesses 34, 34 for holding cups or the like, when member 23 is slid to the rear, as shown, or even where it remains in its closure position, as shown in FIG. 4. FIG. 4 depicts a modification of member 22 (and member 21 although not shown) wherein slots 36 are provided for hanging cooking utensils 37, (not shown).

Figure 5:
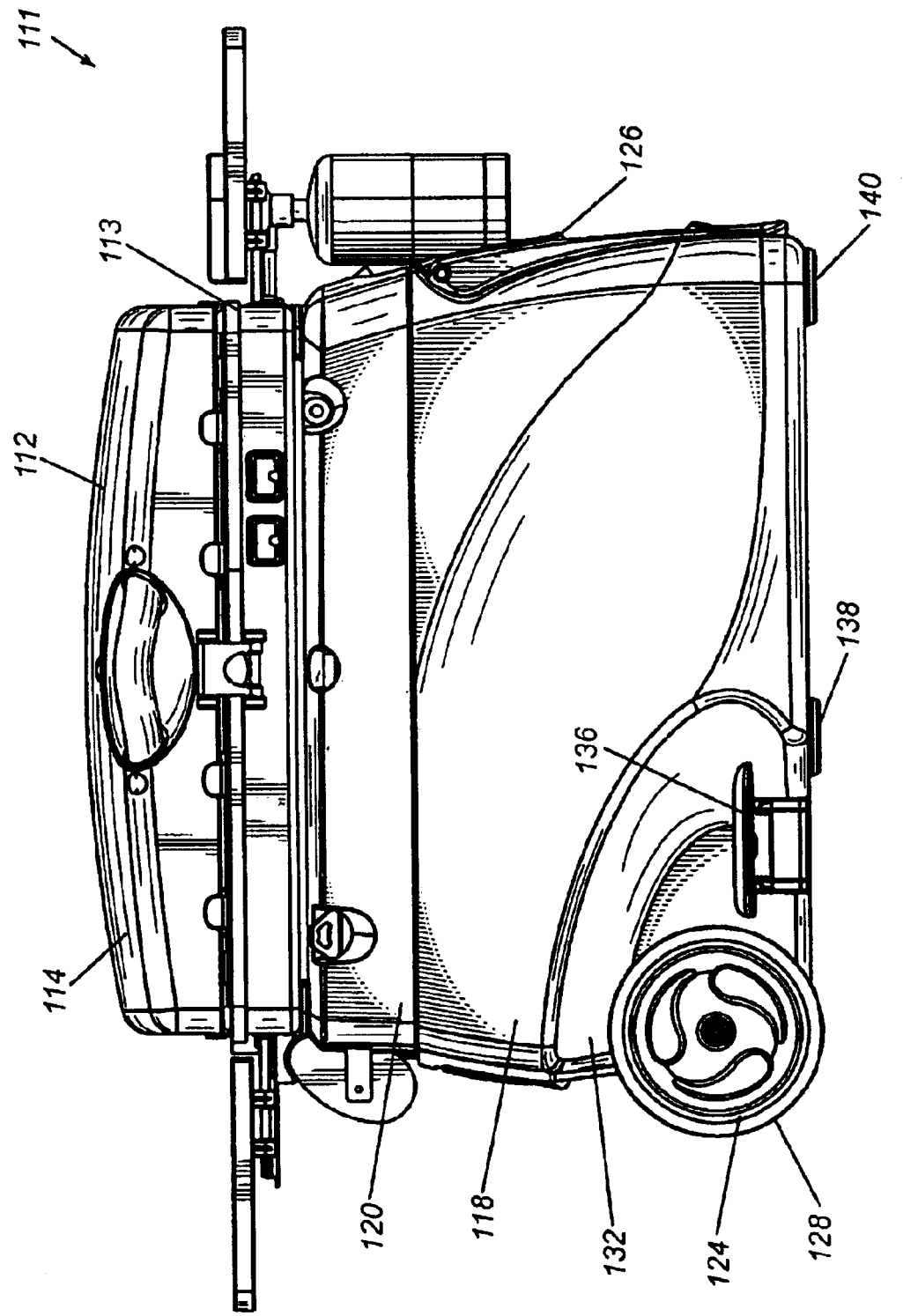
FIG. 5 is front plan view of another embodiment of a grill/chest combination in accordance with the present invention.

Another embodiment of a grill/chest combination in accordance with the present invention will now be described with respect to FIGS. 5–19. As shown in FIG. 5, grill/chest combination 111 includes a grill 112 that incorporates a bottom casting 113 and a fitted top casting 114. Preferably, the top casting 114 is hinged to the bottom casting 113. Grill 112 will be described in detail later with respect to FIGS. 20–27.

Grill 112 is supported by a thermal chest 118. Between the thermal chest 118 and grill 112 is a plinth 120 that is used to support the grill.

Figure 6:
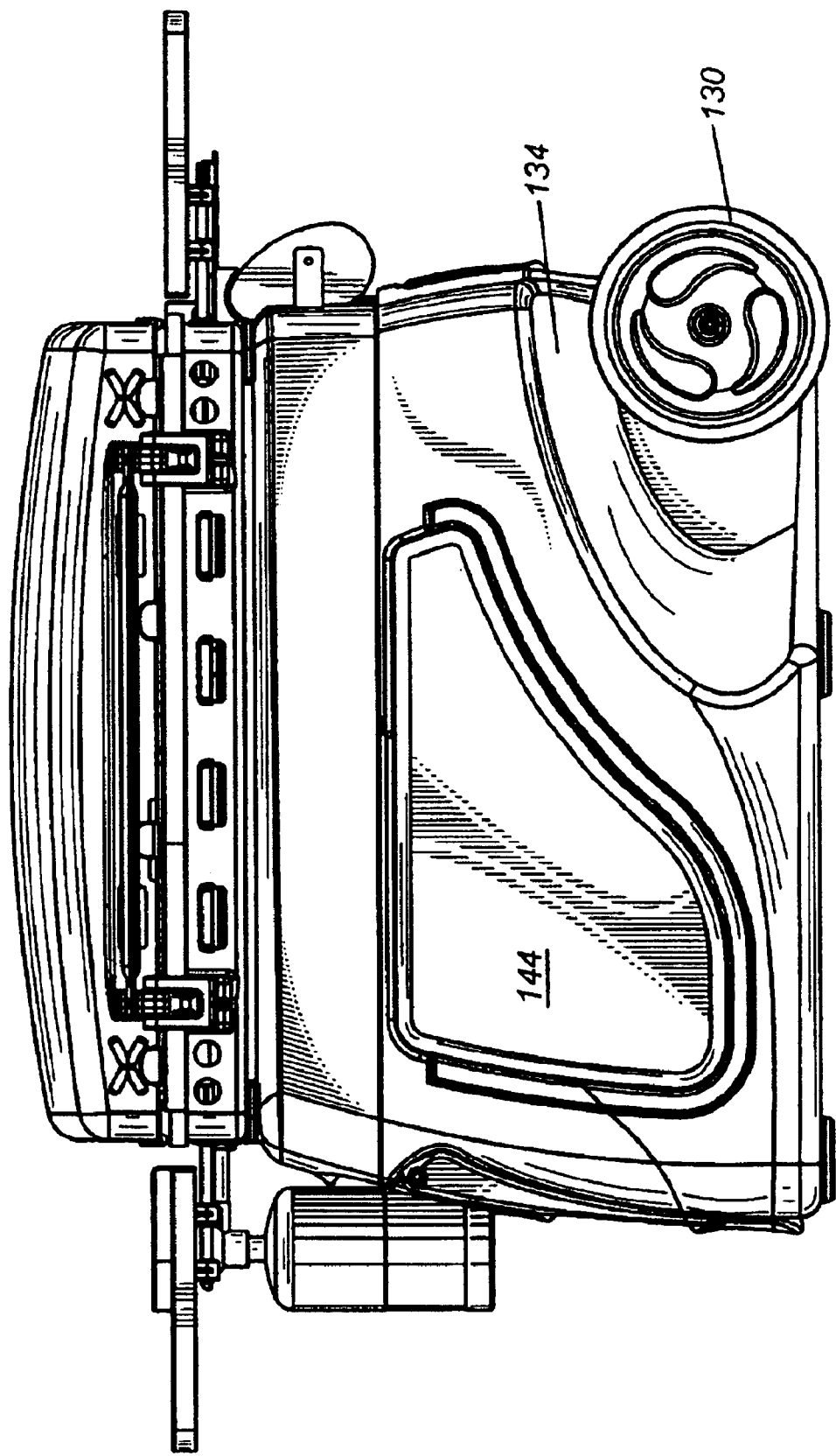
FIG. 6 is a rear plan view of the grill/chest combination of FIG. 5.

Chest 118 includes a wheel and axle arrangement 124 at one of its ends and a foldable handle/shelf assembly 126 at the other of its ends. As shown in FIGS. 5 and 6, wheels 128 and 130 of the wheel and axle arrangement are each received within a respective recess 132, 134 of the chest. Recess 132 also is sized to accommodate placement of foot pedal 136, which is used to raise and/or lower the grill 112 with respect to the chest 118 (described later). Also depicted in FIG. 5 are feet 138 and 140, which are used to support the bottom of the chest and generally level the chest with respect to the wheel arrangement. Note, the side view of FIG. 6 depicts an indentation 144. A net (not shown) can be mounted in a vicinity of the indentation to provide a storage area that can be used for storing cooking utensils, for example.

Figure 7:
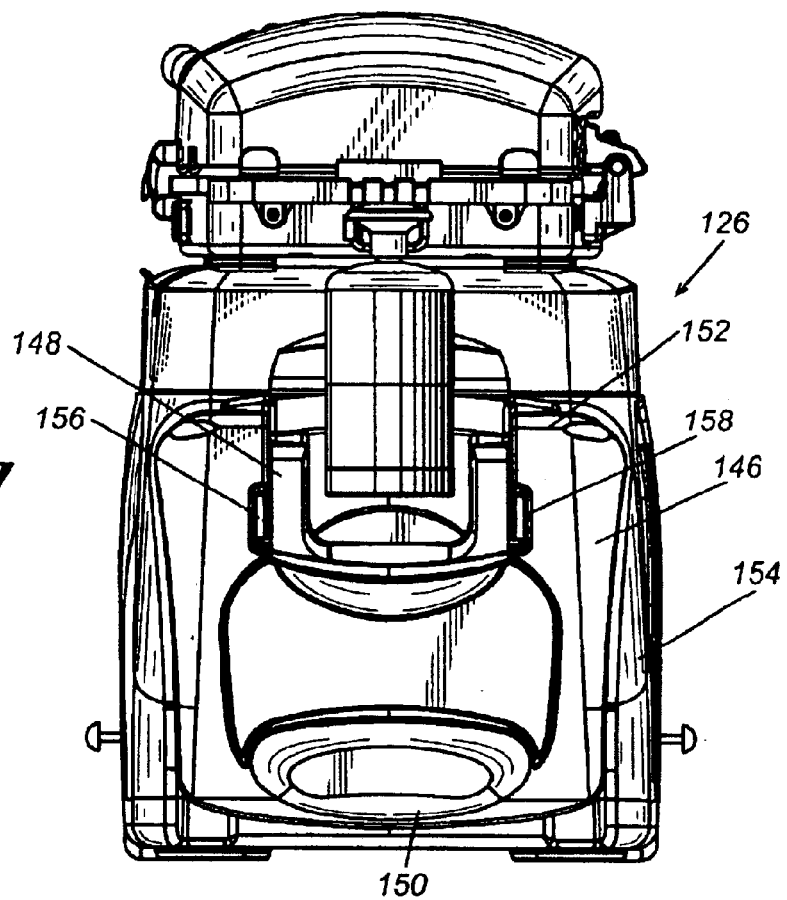
FIG. 7 is a plan view an end of the grill/chest combination of FIG. 5.
Figure 8:
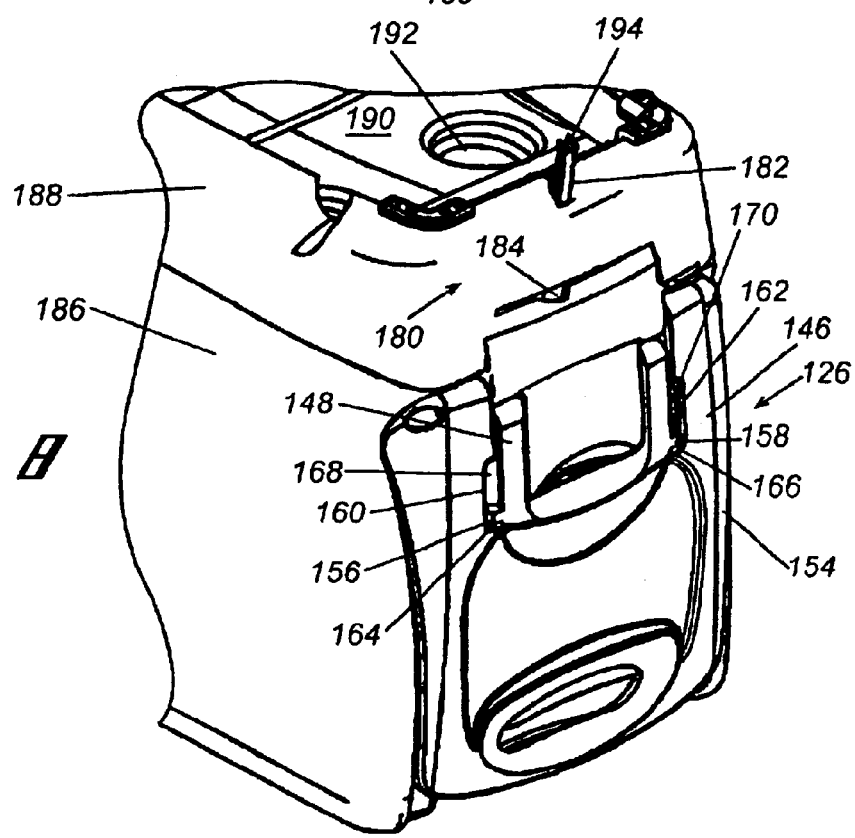
FIG. 8 is a perspective view of the grill/chest combination of FIG. 5, showing detail of the handle/shelf assembly.

Referring now to FIGS. 7 and 8, the handle/shelf assembly 126 is shown in greater detail. As shown in FIGS. 7 and 8, the handle/shelf assembly includes a pull handle 146 which can function as a shelf, and a lift handle 148. The pull handle 146 is a generally C-shaped structure incorporating a hand grip 150 at one of its ends and is hingedly mounted to a bracket 152 at the other of its ends. The pull handle, although depicted in a down position in FIGS. 7 and 8, can be grasped by a user and rotated upwardly so that it extends outwardly from the end of the chest. Typically, when in the extended position, the pull handle forms an angle of approximately 90 degrees with the endwall 154 of the chest.

During upward rotation of the pull handle 146, the lift handle 148 moves in conjunction with the pull handle and tends to lock the pull handle in the outwardly extended position with respect to the chest. More specifically, the lift handle 148 includes outwardly extending tabs 156, 158 that are received within opposing channels 160, 162 of the pull handle. The tabs float within the channels so that when the pull handle is moved to the extended position, the lift handle also is moved to extend outwardly from the chest. Note, respective first ends 164, 166 of the channels are spaced farther from each other than the second ends 168, 170 so that, as the lift handle is rotated toward its extended position, friction between the tabs and the channels is increased. Thus, the pull handle serves as a friction fit bracket that tends to prevent the pull handle from collapsing toward the chest. This is particularly useful when the chest is encumbered with items and the user is pulling the grill/chest combination by using the pull handle. This is because the increased weight of the chest may tend to allow the grill/chest combination to continue rolling toward the user when forward notion of the user has stopped unless the pull handle is retained in the extended position.

Figure 9:
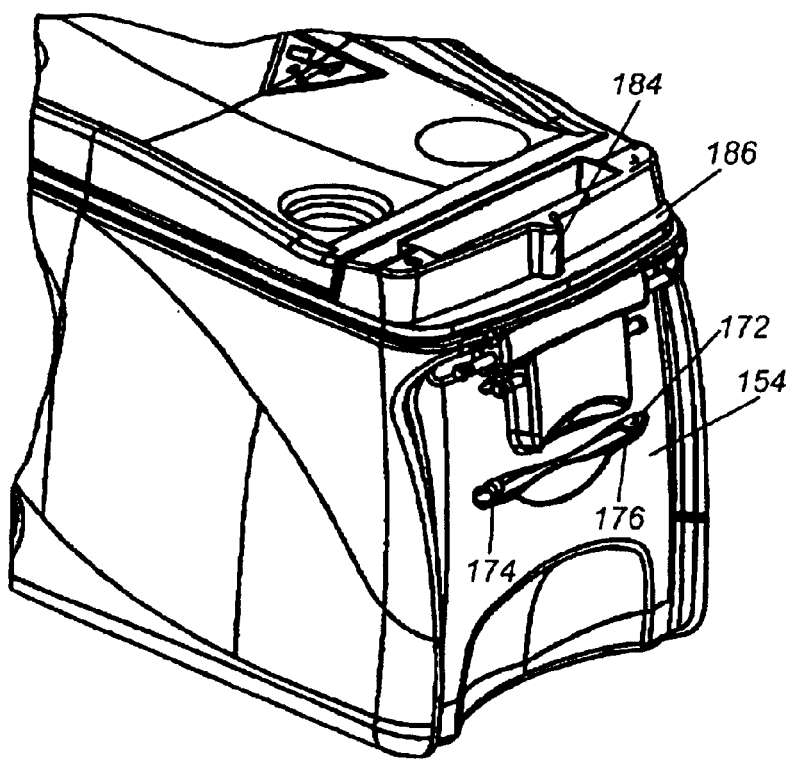
FIG. 9 is a perspective view of the grill/chest combination of FIG. 5, with the handles removed, showing detail of the handle assembly mounts.

As shown in greater detail in FIG. 9, the endwall 154 of the chest includes a mount 172 that includes two C-shaped tabs 174, 176 that extend outwardly from the endwall. Each of these tabs is adapted to receive a portion of a mounting brace (345 of FIG. 18) that nests within an underside recess of the pull handle. The tabs support the brace, which is pivoted from the underside of the pull handle when the handle is in the extended position so that the pull handle can be locked in place and used as a supporting shelf.

Also shown in FIGS. 8 and 9 is a gas interlock assembly 180 that includes a biased interlock 182 and a mechanical stop 184. In FIG. 8, it is shown that an upper surface 186 of the chest is sized and shaped to accommodate placement of a plinth 188. Generally, the plinth is a support structure that at least partially separates the bottom casting of the grill from the upper surface of the thermal chest. Specifically, plinth 188 of the depicted embodiment includes a recess 190 along its upper surface that is sized and shaped to receive the bottom casting of the grill. Additionally, this embodiment includes indentations 192 that preferably are sized and shaped to receive beverage containers when the grill is detached from the plinth.

Gas interlock assembly 180 is mounted to the plinth so that the interlock protrudes outwardly away from the plinth and thermal chest. Although not shown in FIG. 8, the outwardly extending end 194 of the interlock member is adapted to be received in proximity to a gas orifice of the grill. In particular, the gas orifice is used to couple a gas source to the grill so that fuel can be provided to the grill for heating. Note, the interlock member typically is biased to the extended position depicted in FIG. 8 and, as such, end 194 obstructs the gas orifice so that a gas source cannot be coupled to the orifice. Typically, a spring or other suitable mechanism is retained by the plinth to bias the interlock member. Additionally, mechanical block 184 is located so that when the plinth is in the lowered position depicted in FIG. 8, block 184 provides a mechanically redundant manner for biasing the interlock member to its extended position. This tends to ensure that a gas source cannot be coupled to the gas orifice when the plinth and an associated grill are in the lowered position. Once raised to the raised position, however, the biasing force can be overcome so that a gas source can be coupled to the gas orifice.

Figure 10:
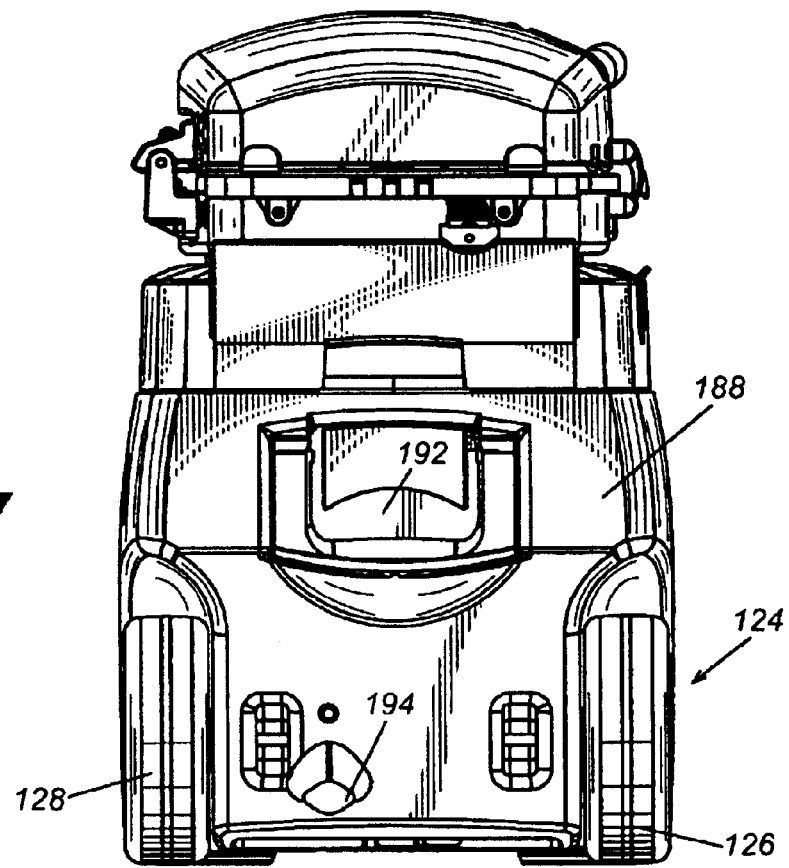
FIG. 10 is a plan view of the other end of the grill/chest combination of FIG. 5.
Figure 11:
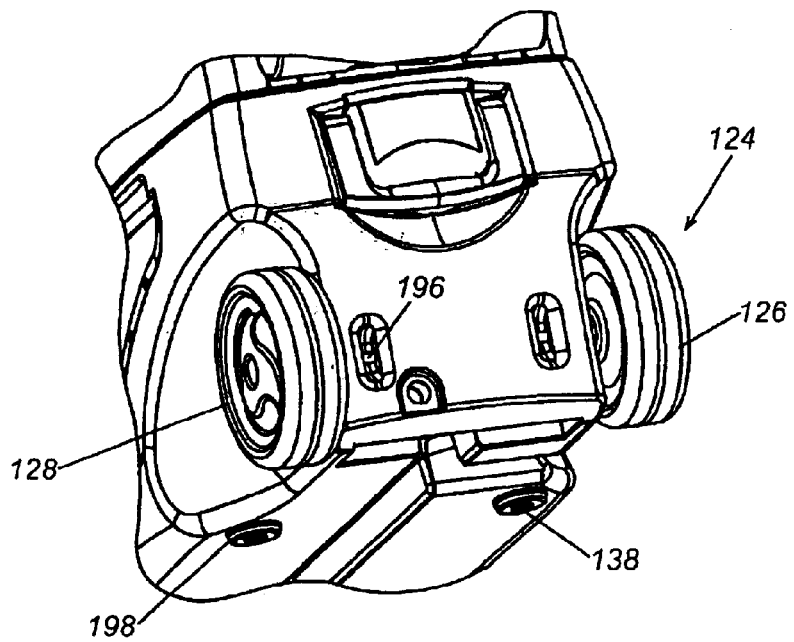
FIG. 11 is a perspective view of the grill/chest combination of FIG. 5, showing detail of the wheel assembly.
Figure 12:
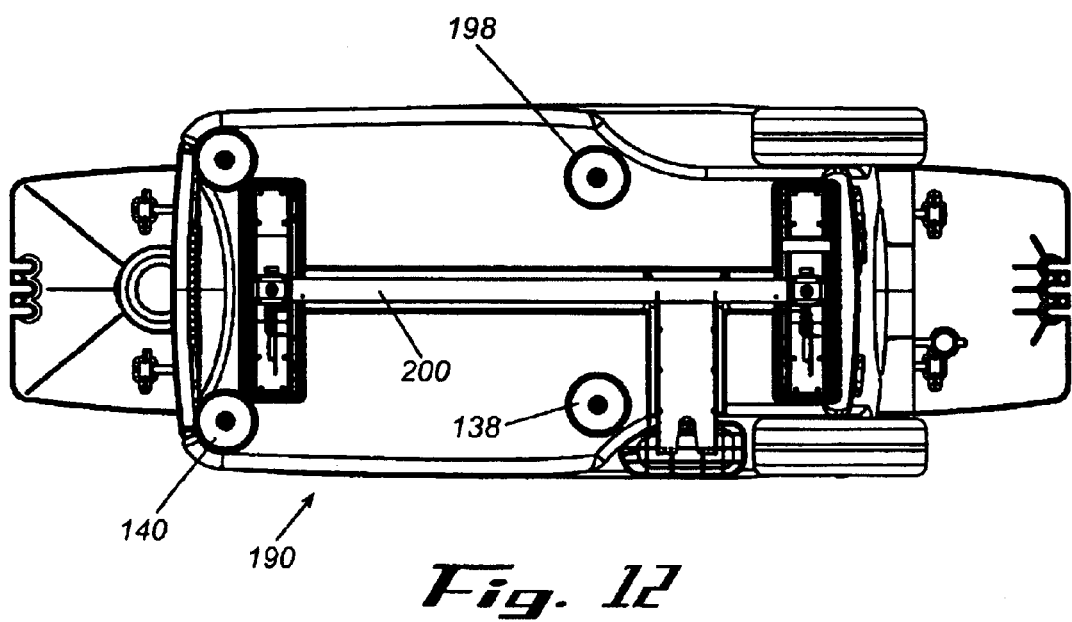
FIG. 12 is a bottom plan view of the grill/chest combination of FIG. 5.

Reference will now be made to FIGS. 10–12 which depict the end 188, wheel and axle arrangement, and bottom 190 of the grill/chest combination, respectively. As shown in FIG. 10, the end 188 includes a lift handle 192, which is constructed and which operates in a manner similar to that described before with respect to lift handle 148. Note, however, that the lift handle 192 does not include tabs for facilitating movement with a pull handle. Also note, a drain 194 is provided for draining contents of the interior of the thermal chest.

As shown more clearly in FIG. 11, the wheel and axle arrangement 124 spans the width of the chest. The wheel and axle arrangement is configured to be a robust assembly, with the axle 196 being supported at six locations along its length. Specifically, the axle is supported at locations where the axle extends outwardly from the chest, as well as at locations where the axle extends through recesses formed in the exterior of the chest. Feet 138, 198 also are depicted in FIGS. 11 and 12. Also depicted in FIG. 12 is the grill repositioning assembly 200 (described later) which is used to move the grill between its lowered and raised positions.

Figure 13:
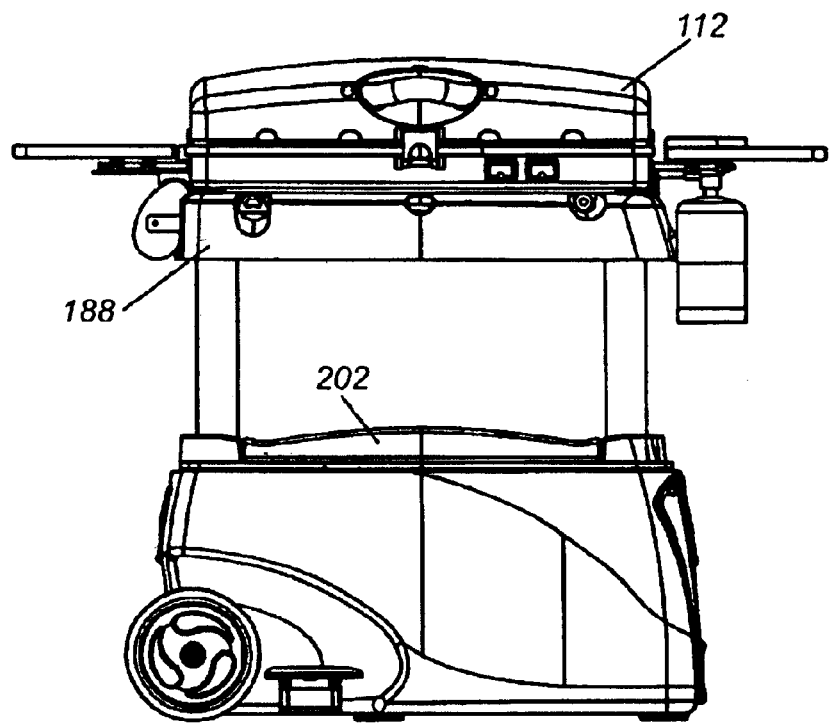
FIG. 13 is a front plan view of the grill/chest combination of FIG. 5, with the grill in a cooking position.
Figure 14:
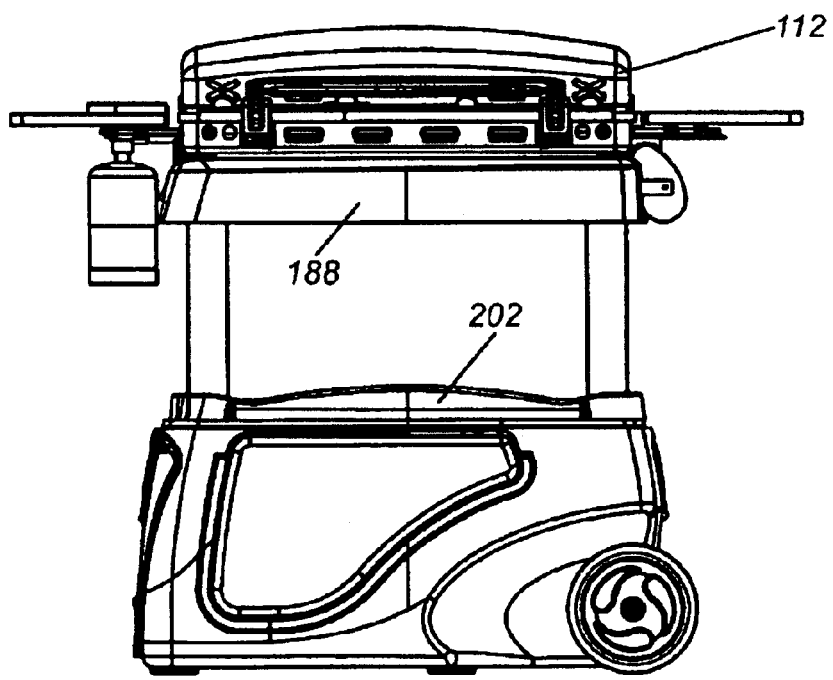
FIG. 14 is a rear plan view of the grill/chest combination of FIG. 5, with the grill in the raised position.

As shown in FIGS. 13 and 14, the grill 112 can be repositioned from its lowered position (FIG. 5), in which the plinth and grill prevent access to the interior of the chest, to a raised position, in which the plinth and grill are spaced from an upper surface 202 of the chest. Raising and lowering of the plinth and grill is facilitated by the repositioning assembly 200 which is depicted in FIG. 15.

Figure 15:
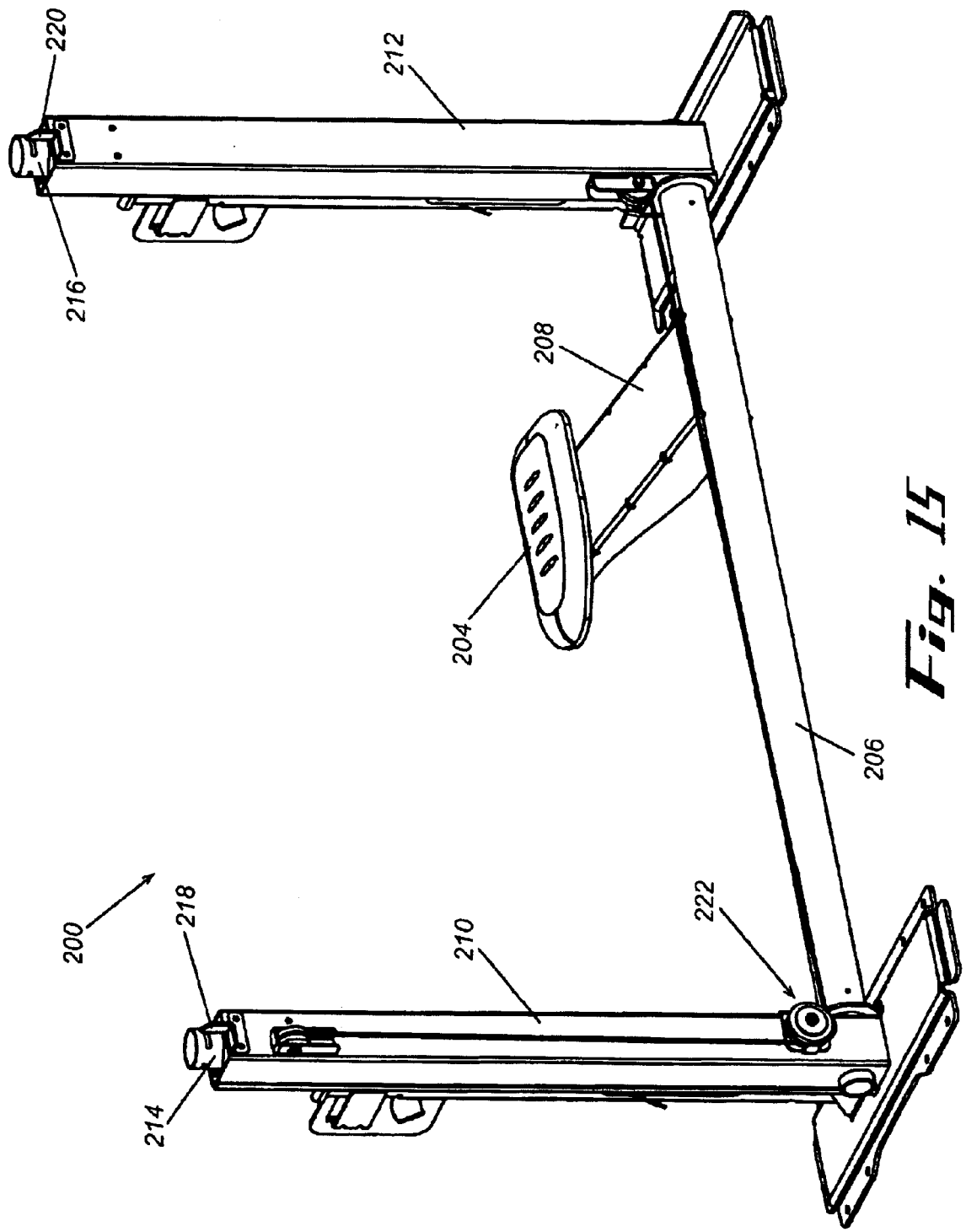
FIG. 15 is a rear perspective view of an embodiment of a grill repositioning assembly.

As shown in FIG. 15, the repositioning assembly 200 includes a pedal 204 that is mounted to a torque tube 206 via a pedal bracket 208. The torque tube pivotally engages a stanchion 210, 212 at each of its ends and is rotatable with respect to the stanchions by moving the foot pedal. Within each stanchion is mounted a slider 214, 216 that is adapted to move longitudinally relative to the stanchion. Preferably, each of the sliders is biased to an extended position (shown in FIG. 15) and is retained in its retracted position within a stanchion by a latch 218, 220. Actuation of the foot pedal tensions a cable and pulley assembly 222 that causes each of the latches to move to their respective unlatched positions. In response, the sliders 214, 216 are able to move toward their extended positions.

Various techniques can be used for biasing the sliders. By way of example, the sliders can be configured as gas struts, wherein moving the sliders toward their respective retracted positions pressurizes a gas reservoir. Alternatively, the sliders can be spring loaded or merely manually operated. In the case of manual operation, the foot pedal can still function to latch and/or unlatch the sliders.

Figure 16:
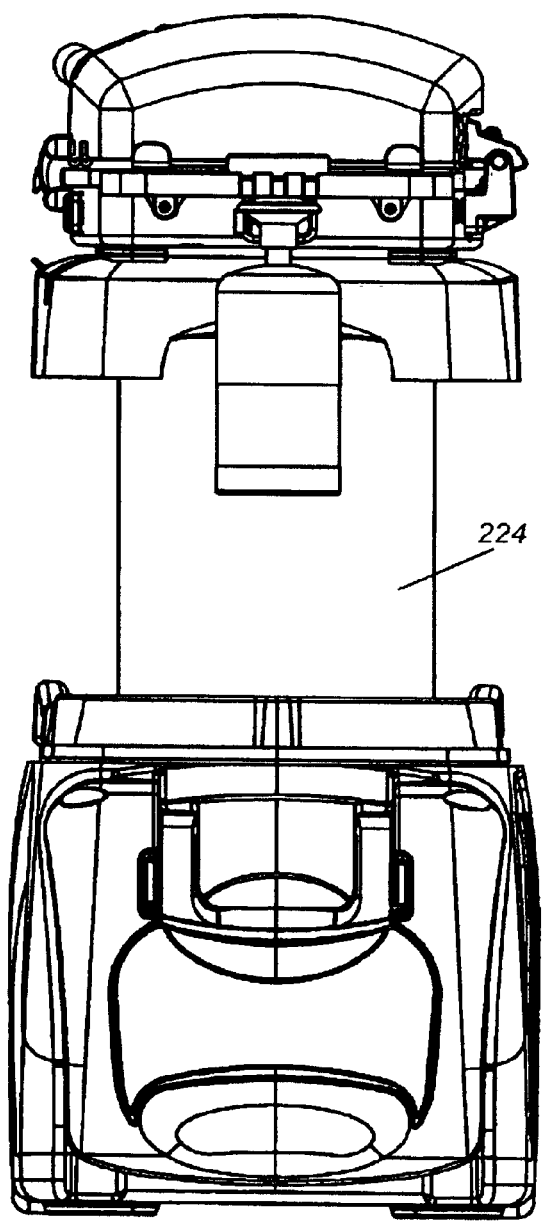
FIG. 16 is a plan view of an end of the grill/chest combination of FIG. 5, with the grill in the raised position.
Figure 17:
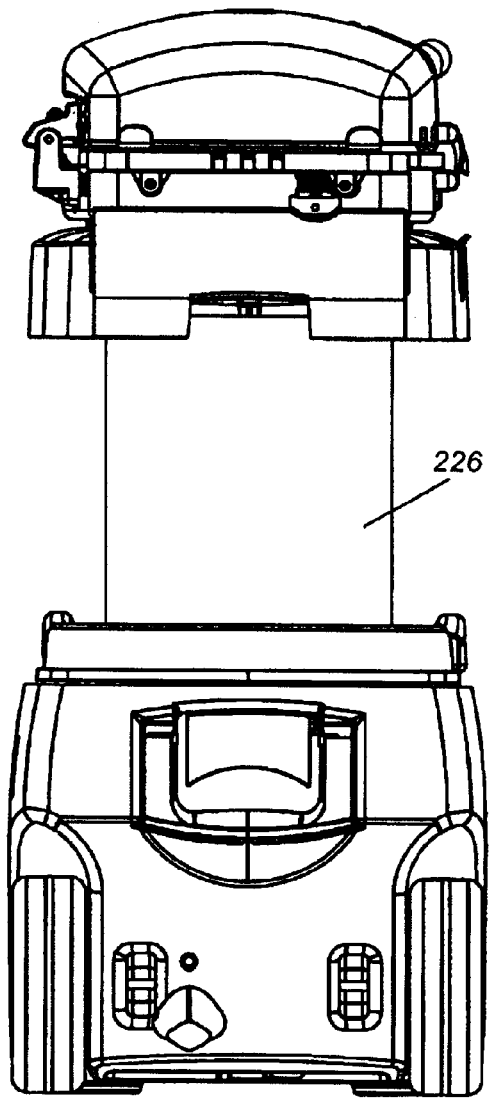
FIG. 17 is a plan view of the other end of the grill/chest combination of FIG. 5, with the grill in the raised position.

Additional end views with the grill and plinth in the raised position are depicted in FIGS. 16 and 17, respectively. Note, in FIG. 16, raising the grill to the raised position spaces the plinth and grill sufficiently from the thermal chest to accommodate placement of a gas source, in this case, a portable LP gas container. Also note, that with the plinth and grill moved to the raised position, the gas interlock mechanism can be moved to its retracted position so that access to the gas orifice is unobstructed. Additionally, the sliders of the repositioning assembly are housed within sleeves 224, 226.

Figure 18:
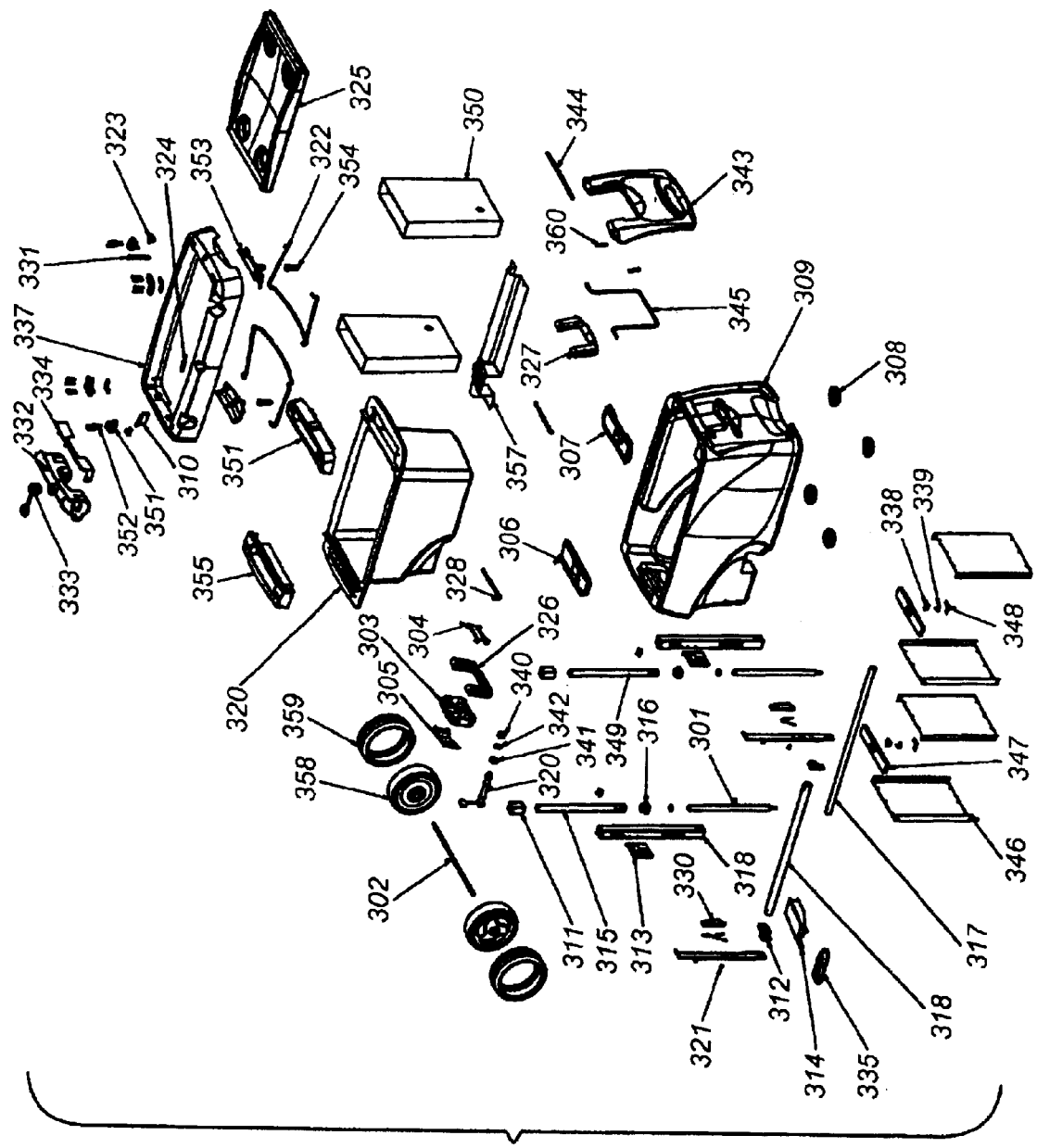
FIG. 18 is an assembly diagram depicting the constituent components of the grill/chest combination of FIG. 5.

The assembly diagram of FIG. 18 depicts constituent components that can be used to form the embodiment previously described with respect to FIGS. 5–17. Note, the parts list that follows should be understood as being merely representative of parts that can be used, while various other configurations of similarly functioning components, for example, could be used in constructing the aforementioned representative embodiment.

| | |
|---|---|
| 301 | air strut |
| 302 | axle wheel |
| 303 | back handle block |
| 304 | back handle block bosses |
| 305 | back handle block cover |
| 306 | base plate back |
| 307 | base plate front |
| 308 | body-feet |
| 309 | body-grill2gocooler |
| 310 | bottle-opener |
| 311 | cr-brush |
| 312 | cr-connection-bracket |
| 313 | cr-guide-bracket |
| 314 | cr-pedal-connection-bracket |
| 315 | cr-slider |
| 316 | cr-slider-cup |
| 317 | cr-spine |
| 318 | cr-stanchion |
| 319 | cr-torque-tube |
| 320 | drain-plug |
| 321 | latch-locking-plate-spring |
| 322 | leg wireform |
| 323 | leg wireform support |
| 324 | level indicator |
| 325 | lid |
| 326 | lift-handle-b |
| 327 | lift-handle-f |
| 328 | lift-handle-pin |
| 329 | liner-grill2gocooler |
| 330 | locking-plate |
| 331 | nozzle-connection-wall |
| 332 | oil-bottle |
| 333 | oil-bottle-lid |
| 334 | oil-bottle-rib |
| 335 | pedal |
| 336 | pin-latch-locking-plate |
| 337 | plinth-grill2gocooler |
| 338 | plinth-lock-hinge |
| 339 | plinth-lock-spring |
| 340 | plug-nut |
| 341 | plug-washer |
| 342 | plug-washer-2 |
| 343 | pull-handle |
| 344 | pull-handle-pin |
| 345 | pull-handle-wire-brace |
| 346 | skirt |
| 347 | skirt-cover |
| 348 | skirt-spring-cover |
| 349 | skirt-unlock-plate |
| 350 | sleeve |
| 351 | stand-off-body-chillngrill |
| 352 | stand-off-mushroom |
| 353 | t-post |
| 354 | t-post-pin |
| 355 | tower-back-bezel |
| 356 | tower-front-bezel |
| 357 | vac-form-base |
| 358 | wheel |
| 359 | wheel-tread |
| 360 | wire-bracket-brace |

Figure 19:
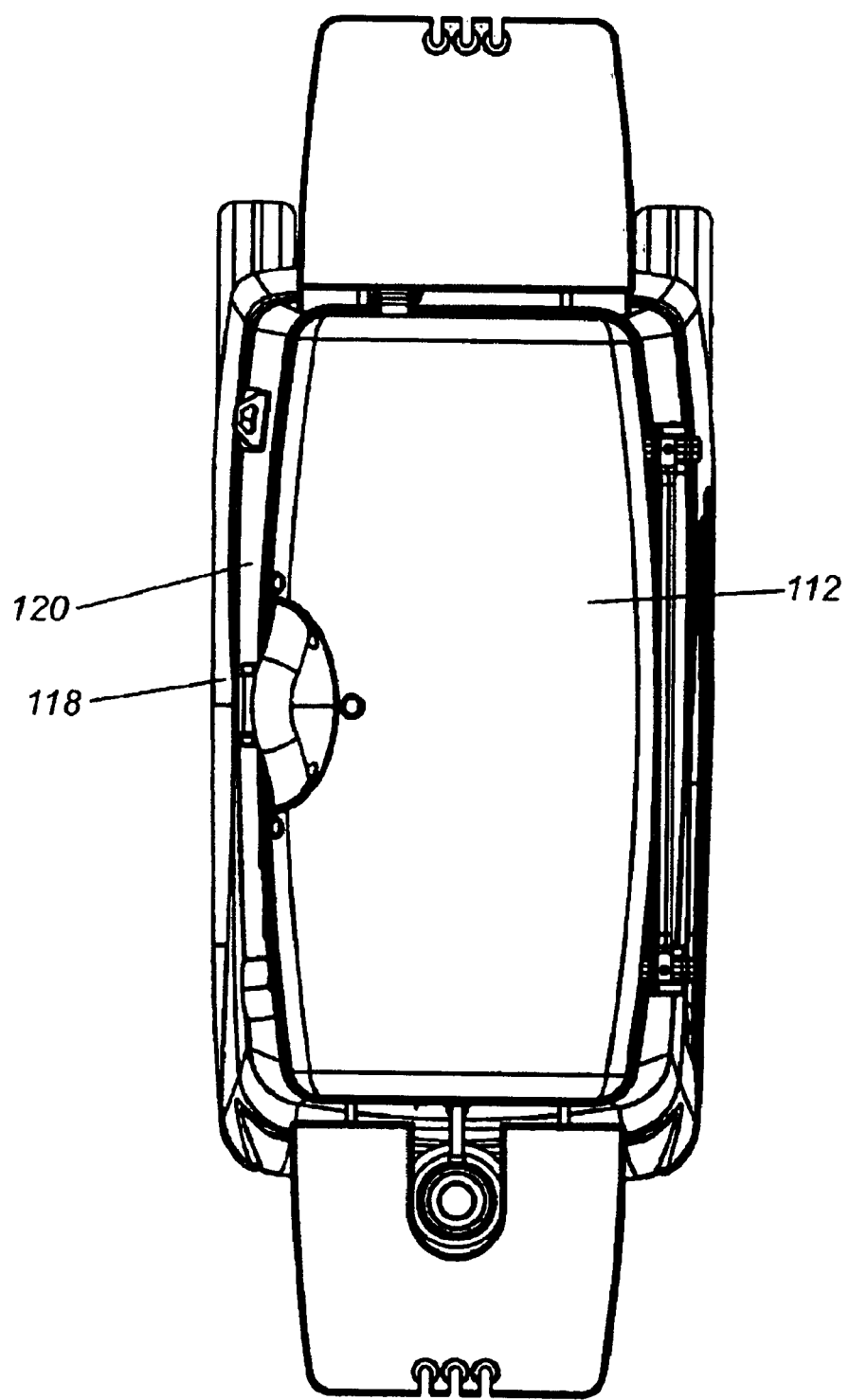
FIG. 19 is a top plan view of the grill/chest combination of FIG. 5.

FIG. 19 depicts a top plan view of the embodiment depicted in FIGS. 5–18. Various features of the grill will now be described in FIGS. 20–27. It should be noted that the embodiments depicted in FIGS. 20–27 utilize a leg assembly that support the top and bottom grill castings. When used with the grill/thermal chest embodiments described above, the these legs may be omitted. Optionally, other legs can be provided, such as foldable legs mounted to the plinth.

FIG. 20 illustrates an embodiment of a portable grill apparatus 410 in accordance with the present invention as arranged for use in a full height configuration. Generally, the grill apparatus 410 comprises a grill 412, a frame 414, and a leg assembly 416. The grill apparatus 410 may also include a preferable but optional side shelf 418 to provide extra room for preparation and placement of food or placement of cooking tools and utensils. The grill 412 preferably comprises aluminized steel, while the frame 414 and leg assembly 416 preferably comprise a heat resistant composite material. It is preferred that the optional side shelf 418 comprises a lightweight, heat-resistant material.

More specifically, the grill 412 of the preferred embodiment comprises a firebox 420 arranged and configured to receive a hood 422. The grill 412 preferably includes various gauges (26, 28, 30) viewable and accessible from the exterior of the grill 412 when the hood 422 is seated on the firebox 420. Preferred gauges include, but are not limited to, a grill level indicator 26, a temperature level indicator 28 and a grease level indicator 30. Although as illustrated, the above-mentioned gauges are positioned on a front face of the firebox 420 of the grill 412, it should be understood that these gauges can be located at various positions about the grill apparatus 410.

The grill apparatus 410 preferably comprises at least one or a pair of the optional side shelves 418. In a preferred embodiment at least one of the side shelves 418 includes at least one receiving aperture 431. The receiving aperture can be arranged and configured to releasably receive typically used grilling tools, such as a spatula, tongs, or the like (not shown). The side shelf 418 can also comprise a fuel aperture 450 disposed therein to provide a user access to a fuel source 446 (FIG. 21) while keeping the fuel source 446 out of the way of the user. The side shelf 418 preferably comprises a substantially planar member having a thickness and a pair of prongs 451 (FIGS. 21 and 23) extending therefrom. The prongs 451 are arranged and configured to be releasably received by a portion of the grill 412, such as a receiving end 482 (FIG. 27) of a support member 480 disposed within the firebox 420 of the grill 412.

The hood 422 can be releasably fixed to the firebox 420 with a locking latch 424 which maybe mounted on either the hood 422 or on the firebox 420. The grill 412 also preferably includes a handle 432 whereby the grill 412 can be easily carried when the locking latch 424 is in a locked position. In the configuration illustrated, the handle 432 can also be used to raise the hood 422 from its seated position on the firebox 420. The handle 432 is illustrated as disposed toward a front and top face of the hood 422 of the grill 412; however, it should be understood that the grill handle 432 can be located in various positions about the grill apparatus 410.

The frame 414 preferably includes a leg assembly 416 extending therefrom and is arranged and configured to releasably receive the firebox 420 of the grill 412. The leg assembly 416 is preferably capable of being arranged in either an extended position (FIG. 20) or retracted position (FIGS. 24 and 25) and comprises at least a pair of leg members 434, each leg member 434 having a proximal end 436 and a distal end 438. Each leg member 434 can be connected to the frame 414 with a pivotal connection 435 toward the proximal end 436 of the leg member 434. The distal end 438 of each leg member 434 is preferably movable about the pivotal connection 435 and can be locked into a desired position with a locking mechanism 440. In the extended position, as illustrated in FIG. 20, the distal end 438 of each leg member 434 is extended away from the frame 414. A preferred locking mechanism 440 can be tightened to keep the leg members 434 in position. In this configuration, the grill 412 is elevated to approximately waist height of a user and can be reached without bending or kneeling. In the retracted position (FIGS. 24 and 25), the distal end 438 of each leg member 434 is disposed toward the frame 414 and is substantially adjacent the proximal end 436 of the opposite leg member 434. Again, the locking mechanism 440 can be tightened to keep the leg members 434 in retracted position. One type of locking mechanism 440 that can be implemented is a friction screw-type fastener that can be tightened or loosened to facilitate movement of the leg member 434.

Each leg member 434 preferably comprises a pair of standing supports 442 opposite each other and extending from the distal end 438 of each leg member 434. It is preferable that each leg member 434 is substantially solid to provide a sturdy support for the grill 412 and for durability. Each leg member 434 also comprises a flange support 444 disposed toward its proximal end 436. Each standing support 442 preferably contacts the surface upon which the grill 410 is set up for use, such as the ground, when the leg members 434 are in the extended position (FIG. 20). The standing supports 442 are preferably arranged and configured to dig into soft surfaces as necessary, in order to level the grill 410, as further described hereinafter. In the alternative, the grill apparatus 410 can also comprise a leveling block 441, shown in FIG. 21, to aid in leveling the grill apparatus 410. A preferred leveling block 441 includes a continuously level substantially planar surface 443 and a multiple level surface 445. The multiple level surface 445 preferably includes a substantially planar raised portion 447 and a substantially recessed portion 449. In use, the substantially planar surface 443 contacts the surface upon which the grill apparatus 410 will be used. The recessed portion 449 of the multiple level surface 445 releasably receives the standing support 442 of the leg member 434. It is preferable that the apparatus 410 includes as many leveling blocks 441 as necessary to level the apparatus, as discussed hereinafter.

Figure 24:
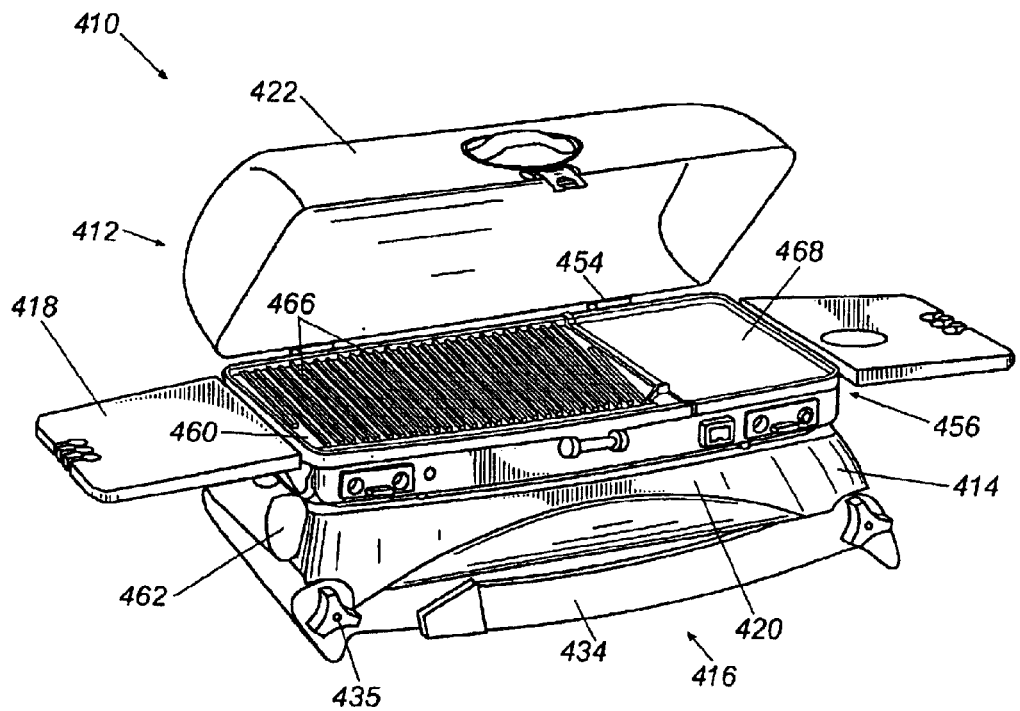
FIG. 24 is a perspective view of the leg assembly in a second position and a first preferred cooking surface configuration disposed in an interior portion of the grill apparatus of FIG. 20.

The preferred flange support 444 is arranged and configured to contact a surface upon which the grill 410 is assembled for use when the leg members 434 are pivoted upward in the retracted position (FIG. 24). In this configuration, the grill apparatus 410 is compact and can be placed upon any surface for use such as a table top or the tailgate of a station wagon, pickup truck or sport utility vehicle. The retracted position also facilitates portability and easy storage of the frame 414 and leg assembly 416.

Figure 22:
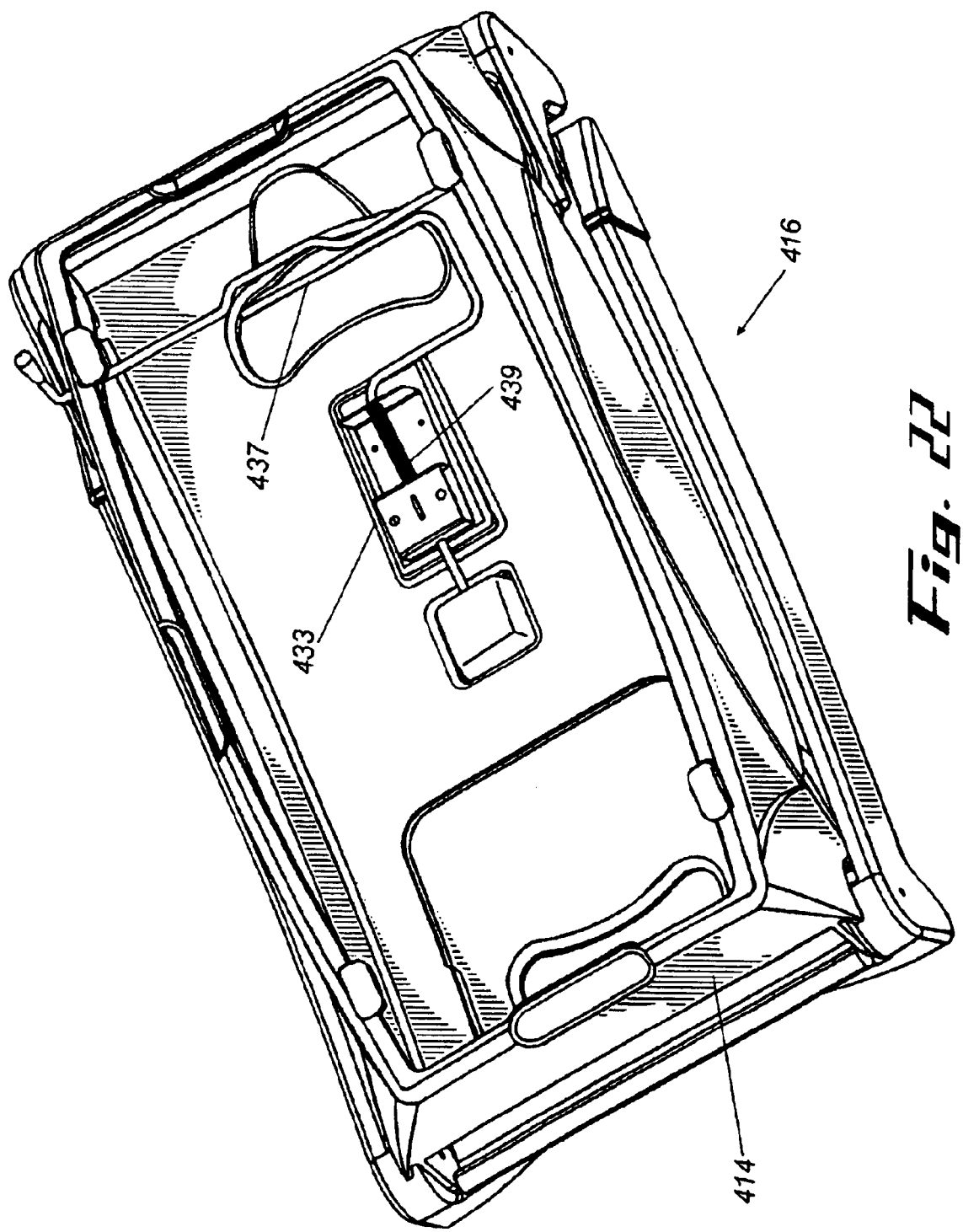
FIG. 22 is a perspective view of a leg member latch disposed on a leg assembly of the grill apparatus of FIG. 20.

The leg assembly 416 can also include a leg member latch 433, as illustrated in FIG. 22, for locking the pair of leg members 434 in the retracted position. The leg member latch 433 is preferably easily movable between a latching and unlatching position and can be spring loaded, or the like, for easier movement therebetween. The optional leg member latch 433 can be disposed on an inner surface of a leg member 434 and can comprise a hook (not shown) arranged and configured to engage a loop (not shown) disposed on an internal surface of an opposing leg member 434. The hook engages the loop to releasably fix the leg assembly 416 in the retracted position (FIG. 22).

To easily move the leg assembly to the extended position, a user can slide a release lever 437. It is preferable that the release lever 437 is disposed substantially adjacent the leg assembly handle 452 for easy access by the user with one hand. The release lever 437 is connected by a spring 439 to the hook (not shown), and, when manipulated, disengages the hook from the loop and releases the leg members 434 from their nested position. Similarly, when fixing the leg member assembly 416 in the retracted position, the leg members 434 are moved into the proper position and a user can slide the release lever 437 away from the leg member latch 433 until the hook and loop are substantially in alignment. The hook and loop can be engaged by the user then releasing the leg member lever 437. It is preferable that the leg member latch 433 can be operated with one hand of a user.

Figure 21:
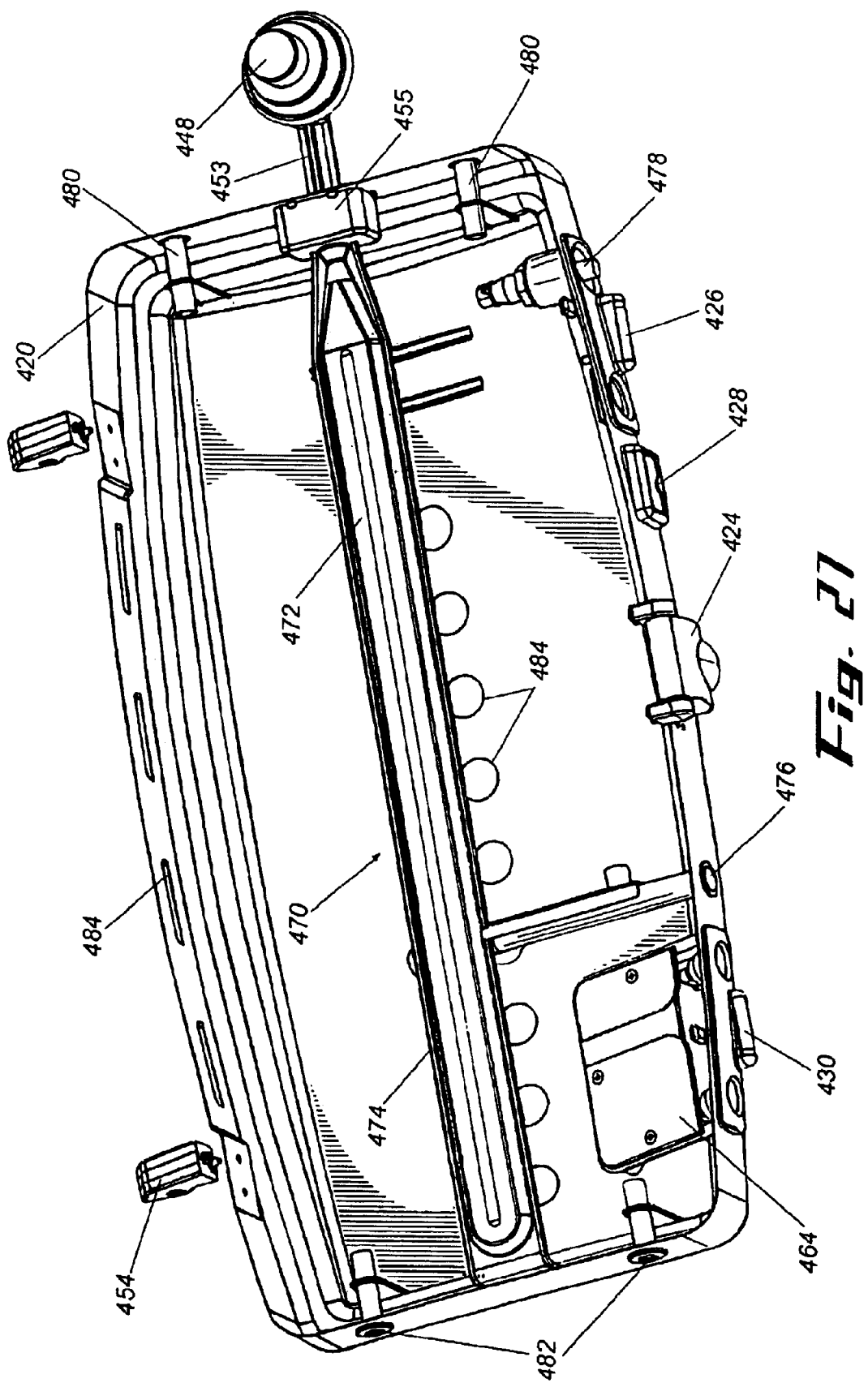
FIG. 21 is a front view of portable grill apparatus of FIG. 20, including optional fuel sources, shown in dashed lines.

The grill 410, in a preferred embodiment, is fueled by gas, such as propane. Common propane tanks on the market today come in various sizes, of which the grill 410 is capable of accommodating, as illustrated in FIG. 21. In one configuration, the heat source of the grill 410 (illustrated in FIG. 27 and discussed in detail hereinafter) can be fueled by a fuel source 446, such as a 1-pound LP tank. In another embodiment, a fuel source 446' comprising a 20-pound LP tank can be used to fuel the heat source 446. In this configuration, it is preferable that a connection hose 450 is used as a conduit between the fuel source 446 and the grill itself 410. Both fuel sources 446, 446' can be interchangeably received by a quick connect valve 448 extending from the grill 412. It is preferable that the quick-connect valve 448 is accessible from the exterior of the grill 412 It is further preferable that the quick-connect valve 448 is easily accessible by a user but that the fuel source 446 is out of the way. A fuel aperture 450 disposed in a side shelf 418 (FIG. 20) makes this preferred arrangement possible.

Figure 23:
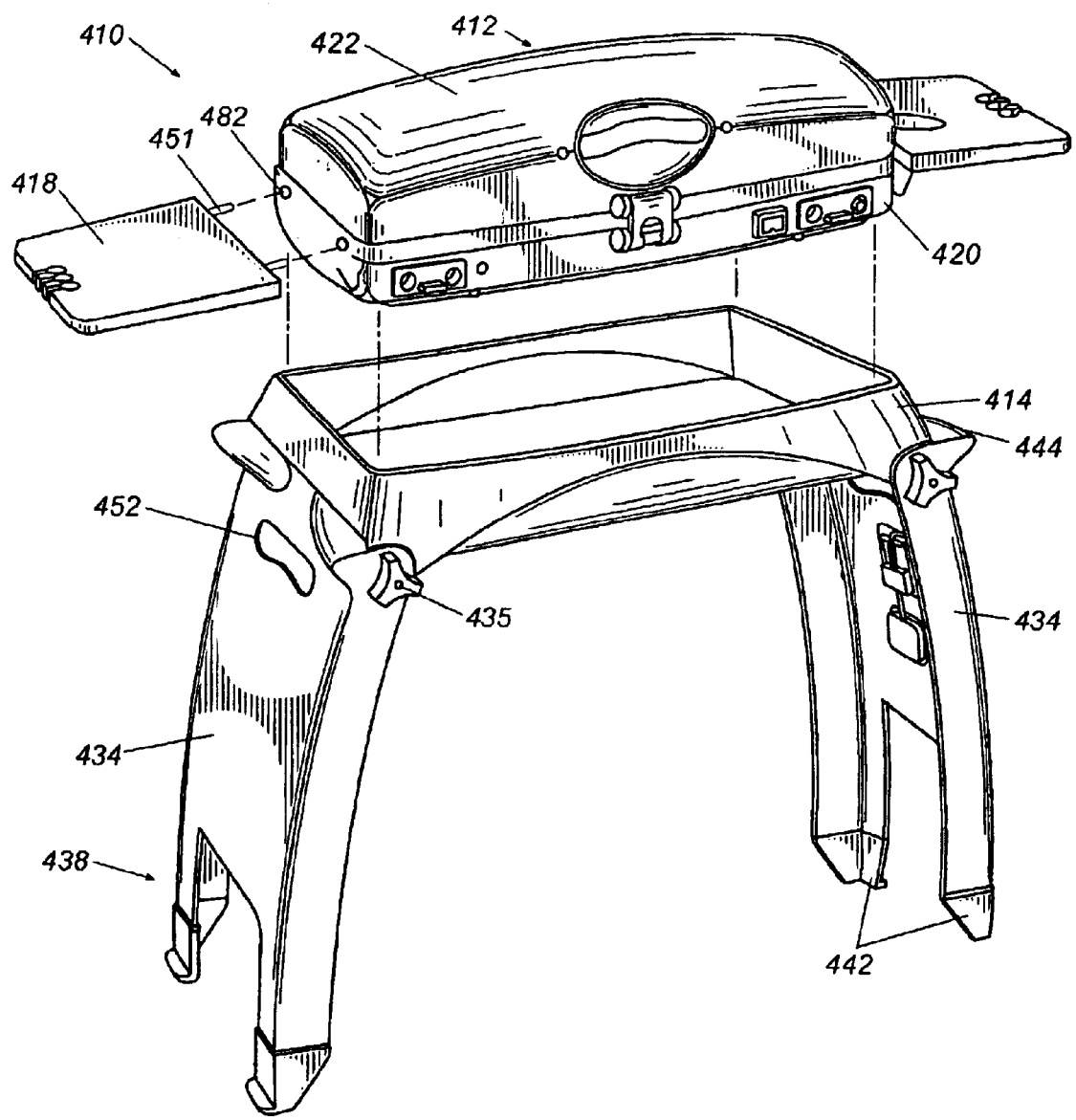
FIG. 23 is a perspective view illustrating assembly and disassembly of the portable grill apparatus of FIG. 20.

Turning next to FIG. 23, it can be seen that the grill apparatus 410 as illustrated in FIGS. 20 and 21 is easily assembled and disassembled as shown, resulting in a grill 410 that is easily portable and storable in limited space. As shown in FIG. 23, the grill 412 can be removed from the frame 414 and the side shelves 418 can be removed from the grill 412, rendering the grill 412 an easily handled, substantially rectangular shape. The side shelves 418, when removed from the exterior of the grill 412, can be stored in the grill 412 or on the frame 414 or leg assembly 416 for portability and storage. It is preferable that the grill 412 is merely seated within the frame 414 to make assembly and disassembly quick and easy. With the firebox 420 and hood 422 closed together and the locking latch 424 locked, the grill 412 can be carried with one hand by the handle 432 disposed thereon. As can now be seen, it is preferable that the frame 414 is substantially hollow, thereby allowing air to circulate underneath the grill 412. As described above, the leg assembly 416 can be disposed in a retracted position (as illustrated in FIG. 24) and releasably fixed into position with the locking mechanism 440. In this configuration, a leg assembly handle 452, disposed in at least one of the preferred pair of leg members 434, cart be used to grasp and carry the frame 414 leg assembly 416 combination with one hand. As such, the entire grill apparatus 410 can be carried in one trip by one user with the grill 412 in one hand and the frame 414/leg assembly 16 in the other.

FIGS. 24–27 illustrate preferred features interior to the grill 12. As seen in FIG. 24, it is preferable that the hood 422 is hingedly connected 454 to the firebox 420. As such, when the hood 422 is "removed" from the firebox 420, the grill 412 opens in a clamshell-like manner. The hinged connections 454 are preferably spring steel type hinges which hold the grill 412 open for cooking when the hood 422 is rotated beyond a predetermined point. Internal to the grill 412, it is preferable that the firebox 420 supports a cooking surface 456 therein. It is preferred that the cooking surface 456 is supported in the bottom 420 at an angle such that a drainage aperture 460 disposed in the cooking surface 456 is located at the lowest point thereof. It is preferable that an external grease trap 462 is in fluid communication with the drainage aperture 460, thereby receiving and containing juices and grease channeled away from the cooking food and into the drainage aperture 460. A cover (not shown) for the aperture of the grease trap is attached thereto, in any suitable manner, for covering the aperture when the grill is not in use, to prevent the ingress of rain, insects, etc. Alternatively, the juices and grease can be channeled through the drainage aperture 460 to an internal grease trap 464 (shown in FIG. 27).

Figure 25:
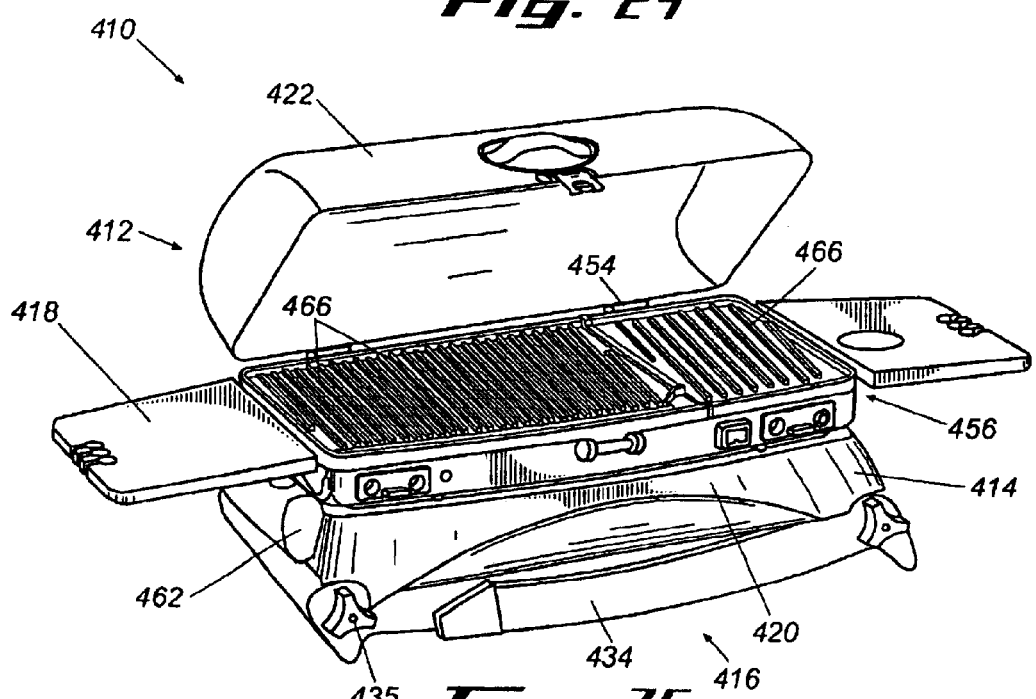
FIG. 25 is a perspective view of the leg assembly in a second position and a second preferred cooking surface configuration disposed in an interior portion of the grill apparatus of FIG. 20.

Focusing on the cooking surface 456, FIGS. 24 and 25 illustrate various embodiments thereof Looking first at FIG. 24, the cooking surface 456 comprises a sear portion 466 and a griddle portion 468. Although the sear portion 466 is illustrated as comprising a larger surface area of the cooking surface 456 than the griddle portion 468, it should be understood that the various cooking surface 456 configurations illustrated and discussed herein can comprise any portion of the cooking surface 456 without departing from the spirit of the present invention. Alternatively, and as illustrated in FIG. 25, the cooking surface 456 can comprise entirely a sear portion 466. In another embodiment (not shown), the cooking surface 456 can comprise entirely a griddle portion 468. The combinations of sear portions 466 and griddle portions 468 can be interchangeable by either removing portions and replacing them with other portions or simply by flipping each portion over to reveal the another cooking surface configuration on the opposite side.

Figure 26:
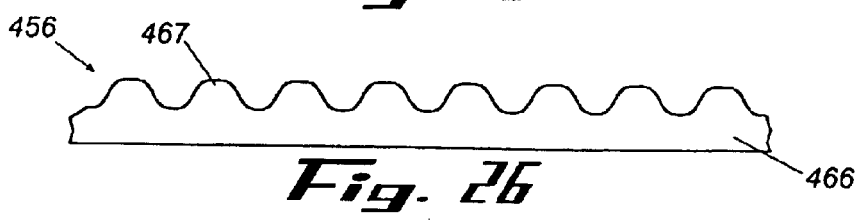
FIG. 26 is a cross-sectional planar view of a preferred cooking surface disposed in an interior portion of the grill apparatus of FIG. 20.

FIG. 26 illustrates a cross section of the preferred sear portion 466. As can be seen, the sear portion 66 is preferably solid, having a corrugated upper cooking surface 467. The preferred sear portion 466 traps all juices and grease released from cooking food thereby preventing those juices and grease from dropping beneath the cooking surface 456 onto a gas burner assembly 470 disposed below.

A preferred gas burner assembly 470 is illustrated in FIG. 27. The gas burner assembly 470 generally comprises a gas burner 472 with a burner shield 474 disposed therebelow and extending the length of the firebox 420. Alternate embodiments can include a shield which substantially surrounds the burner or an embodiment in which the shield is omitted, the burner still being enclosed by the cooking surface and the firebox. The quick-connect valve 448, arranged and configured to receive a fuel source 446, 446' (FIG. 21), is in connection with the gas burner 472 and extends therefrom and outwardly from the firebox 420. The quick-connect valve 448 preferably includes a venturi 453 extending between the quick-connect valve 448 and the gas burner 472. The venturi 453 can either be fixed to the firebox 420 or be releasably fixed thereto with a spring clip, or the like. The venturi 453 is preferably connected to the gas burner 472 at a venturi guard 455. The venturi guard 455 can be disposed either internal to the firebox 420 (as shown) or external to the firebox 420. The gas burner assembly 470 preferably includes a flash tube 476 extending therefrom and providing an outlet to the exterior of the grill 412 for safe release of excess fuel, which may occur during ignition of the gas burner 472. It should be understood that although the flash tube 476 is illustrated as extending from the gas burner 472 toward a front face of the firebox 420, the flash tube 476 can extend in any direction from the gas burner 472 towards the outside environment surrounding the firebox 420. The gas burner assembly 470 preferably includes an automatic igniter 478 whereby a spark can be created to ignite fuel supplied to the gas burner 472. It is preferable that the automatic igniter 478 extends outside the grill 412 and is accessible to a user. It is further preferred that the automatic igniter 478 is substantially inset into an outer surface of the grill 412 keeping it sheltered from weather conditions.

An internal grease trap 464 can also be disposed within the firebox 420. The preferred internal grease trap 464 is arranged and configured to receive juices and grease released from cooking food and channeled along the cooking surface 456 to the drainage aperture 460 disposed therein. The internal grease trap 464 can further comprise a grease level indicator 430 visible from the exterior of the grill 412 when the hood 422 is seated on the firebox 420, thereby readily indicating to a user the level of fluid contained in the internal grease trap 464.

It is further preferable that the firebox 420 includes support members 480 disposed therein. As illustrated, the preferred support members 480 can be at least a partially hollow tube-shaped member having a receiving end 482 disposed substantially flush to an outward surface of the firebox 420. The receiving end 482 of each preferred support member 480 is preferably arranged and configured to releasably receive a prong 451 extending from the side shelf 418 for mounting the side shelf 418 on the exterior of the grill 412. The cooking surface 456 can be placed upon and supported by an inwardly extending elongated portion of each of the support members 480, thereby fully enclosing the gas burner assembly and internal grease trap 464.

While enclosure of the gas burner assembly 470 prevents flame flare-up from juices and grease released from cooking food dripping onto the gas burner 472, air must be introduced to the cavity where the gas burner assembly 470 is located to facilitate combustion. As such, the firebox 420 preferably includes air ventilation apertures 484 disposed therein. Although the present disclosure illustrates the air ventilation apertures 484 as comprising holes and slits disposed along a bottom face and rear face of the firebox 420, respectively, it should be understood that any configuration allowing air flow into the cavity where the gas burner assembly 470 is located (such as apertures located elsewhere in the firebox 420 or cooking surface 456) may be used to achieve the same result.

For ease of use, it is preferable that the grill 412 includes a temperature level indicator 428 and a grill level indicator 426 disposed thereon and visible from the outside of the grill 412 when the hood 422 is seated on the firebox 420. The temperature level indicator 428 can be read by a user to determine the temperature inside the grill 412. The grill level indicator can be read by a user to determine when the grill apparatus 410 is positioned appropriately for cooking to facilitate drainage of the juices and grease from the cooking surface 456 to the external grease trap 462 or, alternatively, the internal grease trap 464. The grill level indicator 426 can comprise a spirit level, commonly referred to as a "carpenter's level" or "bubble level," or the like. The cooking surface 456 is, as pointed out previously, at a compound angle relative to the plane of the firebox 420, slanting forward and to one side to place the grease drainage holes 460 at the low point of the cooking surface. Thus, when the apparatus is leveled, as indicated by the level indicator 426, the cooking surface is at an angle thereto.

It should be emphasized that the above-described embodiments of the present invention, particularly, any "preferred" embodiments, are merely possible examples of implementations set forth for a clear understanding of the principles of the invention. Many variations and modifications may be made to the above-described embodiments of the invention without departing substantially from the spirit and principles of the invention. All such modifications and variations are intended to be included herein within the scope of the present invention and protected by the following claims.

Therefore, having thus described the invention, at least the following is claimed:

1. A combination cooking grill and thermal chest comprising:
    a thermal chest defining an interior and having an opening communicating with and providing access to the interior;
    a grill defining a cooking interior and having a grilling surface mounted within the cooking interior; and a repositioning assembly mounted to the thermal chest, the grill being movable, via the repositioning assembly, between a lowered position in which the grill limits access to the interior of the thermal chest via the opening, and a raised position in which the grill is spaced from the thermal chest such that access to the interior of the thermal chest is provided via the opening.

2. The combination of claim 1, wherein the repositioning assembly comprises:

a fixed support fixed in position with respect to the thermal chest;

a movable support movably engaging the fixed support, the movable support being movable between a retracted position which orients the grill in the lowered position, and an extended position which orients the grill in the raised position.

3. The combination of claim 2, wherein the movable support is biased to the extended position.

4. The combination of claim 3, further comprising a gas reservoir communicating with the movable support such that repositioning the movable support to the retracted position pressurizes the gas reservoir for biasing the movable support to the extended position.

5. The combination of claim 3, further comprising:

a latch movable between a latched position in which the movable support is retained in the retracted position, and an unlatched position in which the movable support is disengaged by the latch; and a foot pedal mounted to the thermal chest and engaging the latch such that actuation of the foot pedal moves the latch to the unlatched position such that the grill can be repositioned to the raised position.

6. The combination of claim 1, further comprising:

a pull handle having a proximal end and a distal end, the proximal end being rotatably mounted to the thermal chest, the distal end including a contoured pull grip, the pull handle being rotatable to an extended position in which the distal end of the pull handle extends outwardly from the thermal chest.

7. The combination of claim 6, further comprising:

a lift handle having a proximal end and a distal end, the proximal end of the lift handle being rotatably mounted to the thermal chest, the distal end including a contoured lift grip, the lift handle being rotatable to a support position in which the distal end of the lift handle extends outwardly from the thermal chest and forms a friction fit with the pull handle such that the pull handle is retained in the extended position.

8. The combination of claim 7, wherein:

the pull handle has first and second channels; and the lift handle has first and second tabs, the first tab being received by the first channel and the second tab being received by the second channel such that movement of the pull handle toward the extended position moves the lift handle toward the support position as the first and second tabs slide within the first arid second channels.

9. The combination of claim 8, wherein the first and second channels are spaced from each other at progressively shorter distances from the distal end of the pull handle to the proximal end such that the first and second tabs are progressively wedged between the first and second channels to form the friction fit with the pull handle as the pull handle is moved to the extended position.

10. The combination of claim 1, wherein:

the grill includes a gas orifice sized and shaped to receive a gas source;

in the lowered position, the gas orifice is obstructed such that the gas source is prevented from coupling with the gas orifice.

11. The combination of claim 10, further comprising:

a gas interlock sized and shaped to obstruct the gas orifice, the gas interlock being movable between an activated position in which the gas interlock obstructs the gas orifice, and a deactivated position in which the gas interlock enables a gas source to be coupled to the gas orifice.

12. The combination of claim 10, wherein:

in response to the grill being moved to the lowered position, the gas interlock moves to the activated position; and in response to the grill being moved from the lowered position, the gas interlock moves to the deactivated position.

13. The combination of claim 11, further comprising:

a plinth mounted to the repositioning assembly and supporting the grill, the plinth being movable with the grill between the lowered position and the raised position, the plinth including a contoured upper surface shaped to receive the grill.

14. The combination of claim 11, further comprising:

means for supporting the grill.

15. A combination cooking grill and thermal chest for use with food items, the combination comprising:

a thermal chest defining an interior, the interior being sized and shaped for receiving food items, the thermal chest further having an opening communicating with and providing access to the interior; and a grill defining a cooking interior, the grill being movable between a lowered position in which the grill limits access to the interior of the thermal chest via the opening, and a raised position in which the grill is spaced from the thermal chest such that access to the interior of the thermal chest is provided via the opening, wherein the grill is detachable with respect to the thermal chest; and the grill includes a lower casting and a pair of opposing foldable leg members, each of the leg members including a distal end, the leg members being movable between a folded position in which the distal end of each of the leg members is located adjacent to the lower casting, and an extended position in which the distal end of each of the leg members extends outwardly from the lower casting to form a support for the grill.

16. A combination cooking grill and thermal chest for use with food items, the combination comprising:

a thermal chest defining an interior, the interior being sized and shaped for receiving food items, the thermal chest further having an opening communicating with and providing access to the interior;

a grill defining a cooking interior, the grill being movable between a lowered position in which the grill limits access to the interior of the thermal chest via the opening, and a raised position in which the grill is spaced from the thermal chest such that access to the interior of the thermal chest is provided via the opening; and a repositioning assembly having first and second fixed supports fixed in position with respect to the thermal chest and first and second movable supports, each of which movably engages a respective fixed support, each of the movable supports being movable between a retracted position which orients the grill in the lowered position, and an extended position which orients the grill in the raised position.

17. The combination of claim 16, further comprising:

a plinth mounted to the repositioning assembly and removably supporting the grill, the plinth being movable with the grill between the lowered position and the raised position, the plinth including a contoured upper surface shaped to receive the grill.

18. The combination of claim 16, further comprising:

a pull handle having a proximal end and a distal end, the proximal end being rotatably mounted to the thermal chest, the pull handle being rotatable to an extended position in which the distal end of the pull handle extends outwardly from the thermal chest; and a lift handle having a proximal end and a distal end, the proximal end of the lift handle being rotatably mounted to the thermal chest, the lift handle being rotatable to a support position in which the distal end of the lift handle extends outwardly from the thermal chest and forms a friction fit with the pull handle such that the pull handle is retained in the extended position.

\* \* \* \* \*